(12) United States Patent
Asakura et al.

(10) Patent No.: US 6,197,430 B1
(45) Date of Patent: Mar. 6, 2001

(54) BIAXIALLY ORIENTED POLYESTER FILMS AND THEIR PRODUCTION METHODS

(75) Inventors: Masayoshi Asakura, Kusatsu; Kenichi Etou, Takatsuki; Tetsuya Tsunekawa, Otsu, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/172,119

(22) Filed: Oct. 14, 1998

(30) Foreign Application Priority Data

Oct. 14, 1997 (JP) .................................................. 9-280349
Nov. 5, 1997 (JP) .................................................. 9-318989
Aug. 3, 1998 (JP) ................................................ 10-218829

(51) Int. Cl.[7] .............................. B32B 27/00; B32B 27/36
(52) U.S. Cl. ..................... 428/480; 428/694.57; 428/910; 528/308; 528/308.1; 528/308.6; 264/288.4; 264/290.2
(58) Field of Search ............................. 428/480, 694 ST, 428/694 SL, 910; 528/308, 308.1, 308.6; 264/290.2, 288.4

(56) References Cited

U.S. PATENT DOCUMENTS 5,409,657   4/1995   Gerwig et al. ..................... 264/290.2
5,709,657   1/1998   Zimmon ................................. 604/96

FOREIGN PATENT DOCUMENTS

| 42-9270 | 5/1967 | (JP) . |
| 43-3040 | 2/1968 | (JP) . |
| 46-1119 | 1/1971 | (JP) . |
| 46-1120 | 1/1971 | (JP) . |
| 50-133276 | 10/1975 | (JP) . |
| 55-22915 | 2/1980 | (JP) . |
| 58-145421 | 8/1983 | (JP) . |
| 9-300455 | 11/1997 | (JP) . |

Primary Examiner—Vivian Chen
(74) Attorney, Agent, or Firm—Foley & Lardner

(57) ABSTRACT

Disclosed is a biaxially oriented polyester film that is 7.0 GPa or more in either the Young's modulus in the machine direction (YmMD) or in the transverse direction (YmTD), and in the range of 55° to 85° in the circumferential half-width of the diffraction line from the crystal plane in the direction of the polyester's backbone chain that is determined through crystal orientation analysis by wide angle X-ray diffractometry performed while rotating the polyester film around its normal. The film is high in rigidity in all directions within the film plane, high in tear resistance, high in dimensional stability, and resistant to deformation under load, and have very great industrial advantages as material for high-density magnetic recording media, with wide applicability as material for electrostatic capacitor, heat transfer ribbon, and base paper for thermosensitive stencil printing.

15 Claims, No Drawings

BIAXIALLY ORIENTED POLYESTER FILMS AND THEIR PRODUCTION METHODS

BACKGROUND OF THE INVENTION

1. Field of the Invention

The present invention relates to biaxially oriented polyester films and their production methods. More specifically, it relates to biaxially oriented polyester films that are high in rigidity in all directions within the film plane, high in dimensional stability, and resistant to deformation under load, and serves as a base film for high density magnetic recording media that shows particularly high travelling durability when used as data-recording tape and improved preservability in tape's service environment, and it also relates to their production methods.

2. Description of the Prior Art

Recent magnetic recording tapes have become thinner and higher in recording density to permit the production of smaller products with longer recording time, and there are increased demands for tape products with smaller elongational deformation under tensile stress and longer preservability in tape's service environment. Under such conditions surrounding the development of magnetic recording tape products, there are increased demands for improved base film materials that are higher in strength as well as form stability and dimensional stability in the tape's service environment.

To provide base films that meet the above requirements, aramid materials have been used conventionally as they are high in strength and dimensional stability. Though they are high in price and disadvantageous in terms of cost, manufacturers have had to use them as there are no alternatives. On the other hand, in conventional methods for producing a high-strength biaxially oriented polyester film, film is once stretched in two directions, i.e., machine and transverse directions, and further stretched in the machine direction to ensure high strength in the machine direction (for example, JP-B-SHO 42-9270, JP-B-SHO 43-3040, JP-A-SHO 46-1119 and JP-A-SHO 46-1120). For additional increase in strength in the transverse direction, "longitudinal and transverse re-stretching processes" in which film is first re-stretched in the machine direction and then re-stretched in the transverse direction have been proposed (for example, such films are proposed in JP-A-SHO 50-133276 and JP-A-SHO 55-22915). High-strength polyester films produced by these conventional methods have such disadvantages as: 1) tape breaks during use, 2) insufficient rigidity in the transverse direction causes edge damage, 3) elongational deformation under stress or dimensional deformation due to environmental conditions result in a shift of recording tracks that cause errors when records are read out, and 4) insufficient strength brings about difficulty in thickness reduction and makes it impossible to achieve required magnetic conversion performance. Thus, many problems still remain to be solved to allow large-capacity, high-density magnetic recording tape to be produced from these films.

Further, another stretching method has been proposed in which preliminary stretching is performed prior to the above-mentioned stretching-orientation process. U.S. Pat. No. 5,409,657, for example, proposes a process in which film is subjected to preliminary stretching at a draw ratio of 1.2 to 3 times in the machine direction at temperatures of (polyester's glass transition temperature Tg+40)° C. to (crystallization temperature Tc−20)° C., followed by stretching in the transverse direction and the machine direction, and shows films that are strengthened only in the longitudinal direction. Further, JP-A-HEI 9-300455 also proposes (a) a process in which film is subjected to preliminary stretching at a draw ratio of 1.5 to 2.5 times in the transverse direction at temperatures of 100° C.–120° C., followed by stretching in the transverse direction and the machine direction, and (b) a process in which a preliminary stretching is performed at a draw ratio of 1.1 to 2.2 times in the machine direction at temperatures of 100° C.–120° C. in addition to the above-described process (a), and shows films that are strengthened only in the transverse direction. Furthermore, JP-A-SHO 58-145421 proposes a process in which film is stretched in the two directions simultaneously at a temperature of 115° C. or higher, followed by simultaneous biaxial stretching, with the aim of producing thin films and increasing the production speed, and shows films with small Young's modulus. Films produced by these technologies, however, are not high in rigidity in all directions and cannot solve the problems associated with applying the material to the production of high-density recording tape.

SUMMARY OF THE INVENTION

It is an object of the present invention to provide biaxially oriented polyester films that are high in rigidity in all directions in the film plane, high in dimensional stability, and resistant to deformation under load, and serves as base film for high density magnetic recording media that show particularly high travelling durability when used as data-recording tapes and improved preservability in tape's service environment, and provide their production methods.

The present inventors have carried out studies to solve these problems, and achieved the invention after finding that film having a certain structure and certain physical properties after biaxial stretching and thermal treatment can serve to produce polyester magnetic recording tapes with reduced edge damage, increased travelling durability and improved preservability.

A biaxially oriented polyester film according to the present invention is 7.0 GPa or more in at least either the Young's modulus in the machine direction (YmMD) or in the transverse direction (YmTD), and in the range of 55° or more and 85° or less in the circumferential half-width of the diffraction line from the crystal plane in the direction of the polyester's backbone chain that is determined through crystal orientation analysis by wide angle X-ray diffractometry performed while rotating the polyester film around its normal.

Films as proposed by the present invention have such favorable embodiments as described below:

(a) The crystal size in the polyester's backbone chain direction is 45 Å or more and 90 Å or less.

(b) The sum of the Young's modulus in the machine direction (YmMD) and that in the transverse direction (YmTD) is 13 GPa or more and 25 GPa or less, and the Young's modulus in an diagonal direction (45° or 135°) is 6 GPa or more and 10 GPa or less.

(c) The creep compliance after being left for 30 minutes under the conditions of a temperature of 50° C. and a load of 28 MPa is 0.11 GPa$^{-1}$ or more and 0.35 GPa$^{-1}$ or less.

(d) The propagating tear strength of the film, converted to 5 μm thickness, in the transverse direction is 0.7 g or more and 1.8 g or less.

(e) The polyester is polyethylene terephthalate.

(f) At least either the ratio $R_1(=I_{MD}/I_{ND})$ of the peak intensity in the machine direction ($I_{MD}$) to that in the normal direction ($I_{ND}$) at 1615 cm$^{-1}$ measured by laser Raman scattering or the ratio $R_2(=I_{TD}/I_{ND})$ of the peak intensity in the transverse direction ($I_{TD}$) to that in the normal direction ($I_{ND}$) is 6 or more.

(g) The refractive index in the normal direction ($n_{ZD}$) is 1.470 or more or 1.485 or less, and the planar orientation index ($f_n$) is 0.175 or more and 0.195 or less.

(h) The density of the film is 1.385 or more and 1.400 or less.

(i) The heat shrinkage starting temperature of the film is 70° C. or more, and the heat shrinkage at the temperature of 80° C. is 0.5% or less.

Such biaxially oriented polyester films according to the present invention as described above serve favorably as base films for high density magnetic recording media, electrostatic capacitors, and thermal transfer ribbons.

Desirable polyester film production methods according to the present invention include, but not limited to, production method (I) and production method (II) described below.

Production method (I) is a biaxially oriented polyester film production method wherein substantially amorphous polyester film is stretched biaxially in the machine direction and the transverse direction so that the birefringence (Δn) and the crystallinity of the film become 0–0.02 and 6% or less, respectively, and then the film is subjected to second transverse stretching at a temperature lower than the temperature for the preceding transverse stretching, followed by second longitudinal stretching.

Production method (I) for producing biaxially oriented polyester films of the invention shall have the favorable embodiments as described below:

(a) The ratio (A/B) of the maximum thickness of the edge part of the substantially amorphous polyester film (A) to the thickness at the center of width (B) is in the range of 2.0–6.0.

Production method (II) is a biaxially oriented polyester film production method that comprises three stretching steps, wherein in the first step, non-stretched cast film is stretched biaxially in the machine direction and the transverse direction simultaneously at a temperature in the range of (polyester's glass transition temperature Tg+25)° C. to (Tg+45)° C. and an area draw ratio of 2 to 7 times, and subsequently in the second step, the film is stretched biaxially in the machine direction and the transverse direction simultaneously at a temperature in the range of (Tg−15)° C. to (Tg+10)° C. and an area draw ratio of 4 to 16 times, and in the third step, the film is further stretched biaxially in the machine direction and the transverse direction simultaneously at a temperature in the range of (polyester's melting point Tm−130)° C. to (Tm−10)° C. and an area draw ratio of 1.5 to 5 times.

Production method (II) for producing biaxially oriented polyester films of the invention shall have the favorable embodiments as described below:

(a) The stretching in the third step is performed in two or more stages of temperature ranges.

(b) The temperature of the film grips that hold the edge of the film is in the temperature range of (polyester's glass transition temperature Tg+15)° C. to (Tg+50)° C.

(c) The film produced by the simultaneous biaxial stretching in the first step has a birefringence (Δn) of 0–0.02 and a crystallinity of 6% or less.

DETAILED DESCRIPTION OF THE PREFERRED EMBODIMENTS

The invention is explained hereinafter in more detail together with the preferred embodiments.

The polyesters referred to in the present invention are defined as polymers that are prepared through the condensation polymerization of a diol and a dicarboxylic acid. Dicarboxylic acids include terephthalic acid, isophthalic acid, phthalic acid, naphthalene dicarboxylic acid, adipic acid, and sebacic acid. Diols include ethylene glycol, trimethylene glycol, tetramethylene glycol, and cyclohexane dimethanol. Specifically, useful polyesters include polymethylene terephthalate, polyethylene terephthalate, polypropylene terephthalate, polyethylene isophthalate, polytetramethylene terephthalate, polyethylene-p-oxybenzoate, poly-1,4-cyclohexylene dimethylene terephthalate, and polyethylene-2,6-naphthalate. Needless to say, these polyesters may be either homopolymers or copolymers, with the copolymerization components being, for example, such diol components as diethylene glycol, neopentyl glycol, and polyalkylene glycol, and such dicarboxylic acid components as adipic acid, sebacic acid, phthalic acid, isophthalic acid, and 2,6-naphthalene dicarboxylic acid. From the viewpoint of mechanical strength, thermostability, chemical resistance, and durability, favorable ones for the invention include polyethylene terephthalate, polypropylene terephthalate, polyethylene isophthalate, polyethylene naphthalate (polyethylene-2,6-naphthalate), and their copolymers. In particular, polyethylene terephthalate is highly desirable for the invention in terms of film characteristics and price. The intrinsic viscosity (IV) of the polyester to be used should preferably be in the range of 0.6 dl/g or more and 1.0 dl/g or less, with the range of 0.65 dl/g or more and 0.80 dl/g or less being particularly desirable from the viewpoint of film forming ability, dimensional stability, and tear resistance.

Any biaxially oriented polyester film of the invention shall be 7.0 GPa or more at least in either the Young's modulus in the machine direction (YmMD) or that in the transverse direction (YmTD), and shall be in the range of 55° or more and 85° or less in the circumferential half-width of the diffraction line from the crystal plane in the direction of the polyester's backbone chain that is determined through crystal orientation analysis by wide angle X-ray diffractometry performed while rotating the polyester film around its normal. The circumferential half-width of the diffraction line from the crystal plane in the direction of the polyester's backbone chain represents the broadening of the distribution of the orientation directions of the crystals in the biaxially oriented polyester film. If the half-width is less than 55°, the propagating tear strength of the film will be small, easily causing tape breakage, whereas if it is more than 85°, it will be impossible to produce a film that is strong in all directions in the film plane, and the goal of the invention will not be achieved. The crystal plane in the direction of the polyester's backbone chain as referred to herein is the crystal plane that is detected as a diffraction line by wide angle X-ray diffractometry with its normal being nearer to the polyester's backbone chain than any other crystal plane. It is (-105) plane for polyethylene terephthalate and (-306) plane for polyethylene-2,6-naphthalate. The above-mentioned half-width should preferably be in the range of 60° or more and 85° or less, most desirably in the range of 65° or more and 80° or less, to achieve the effect of the invention.

If both the Young's modulus in the machine direction (YmMD) and that in the transverse direction (YmTD) of the Young's modulus is less than 7.0 GPa, the film will be too small in rigidity, and thin film produced from it will easily suffer elongational deformation under stress (especially in the machine direction) and edge damage (especially in the transverse direction). Either of the Young's modulus values, YmMD and YmTD, should more preferably be 8 GPa or more from the viewpoint of the tape's elongational deformation and edge damage.

For the present invention, the crystal size in the film in the polyester's backbone chain direction should preferably be in the range of 45 Å or more and 90 Å or less. Here, the polyester's backbone chain direction is defined as the direction of the normal of a crystal plane that is nearest to the direction of the polyester's backbone chain. It is the direction of the normal to the (-105) plane for polyethylene terephthalate and (-306) plane for polyethylene-2,6-naphthalate. If the crystal size is less than 45 Å, the resulting tape will suffer a large elongational deformation, edge damage, and stability during storage of manufactured tape. If the crystal size is more than 90 Å, tape breakage will take place at an increased frequency. The desirable crystal size depends on the polyester used. For polyethylene terephthalate, it should preferably be in the range of 50 Å or more and 85 Å or less, more preferably in the range of 55 Å or more and 80 Å or less. If the polyester used is polyethylene-2,6-naphthalate, the range of 50 Å or more and 65 Å or less is further more desirable.

For the films of the present invention, the sum of the Young's modulus in the machine direction (YmMD) and that in the transverse direction (YmTD), i.e., YmMD+YmTD, should preferably be in the range of 13 GPa or more and 25 GPa or less, and the Young's modulus in the diagonal direction should preferably be in the range of 6 GPa or more and 10 GPa or less. The Young's modulus in the diagonal direction referred to above is defined as the Young's modulus in the film plane in the direction of 45° or 135° assuming that the machine direction and the transverse direction of the film are in the direction of 90° and 0°, respectively. If said sum of the Young's modulus values is less than 13 GPa and the Young's modulus in the diagonal direction is less than 6 GPa, the film is likely to suffer elongation deformation under stress. Conversely, if said sum of the Young's modulus values is more than 25 GPa and the Young's modulus in the diagonal direction is more than 10 GPa, the film is likely to suffer deterioration in tear resistance and heat shrinkage properties, making it difficult to achieve the effect of the invention. The sum of the Young's modulus in the machine direction (YmMD) and that in the transverse direction (YmTD), i.e., YmMD+YmTD, should more preferably be in the range of 14 GPa or more and 20 GPa or less, and the Young's modulus in the diagonal direction should more preferably be in the range of 7 GPa or more and 9 GPa or less. Though depending on the rigidity of the magnetic coat over the base film and the service conditions of the tape, the ratio of YmMD and YmTD, i.e., YmMD/YmTD, should preferably be in the range of 0.6–1.3, more preferably in the range of 0.7–1.2, in order to reduce edge damage. If a magnetic layer is added to the base film to increase the rigidity, YmMD should preferably be 6.0 GPa or more, and YmMD/YmTD should preferably be in the ranges of 0.6–0.9.

For the present invention, the creep compliance of the film left for 30 minutes under the conditions of a temperature of 50° C. and a load of 28 MPa should preferably in the range of 0.11 GPa$^{-1}$ or more and 0.35 GPa$^{-1}$ or less. For the invention, if the creep compliance is more than 0.35 GPa$^{-1}$, the tension that takes place during travelling or storage of the tape will likely to cause elongational deformation of the tape, leading to shifts of tracks during data recording. Conversely, if the creep compliance is less than 0.11 GPa$^{-1}$, tape breakage will take place frequently. For the present invention, the creep compliance should more preferably in the range of 0.15 GPa$^{-1}$ or more and 0.30 GPa$^{-1}$ or less. The creep compliance for this invention is as defined on p.150 in "Kobunshi-kagaku Joron (An Introduction to Polymer Chemistry) 2nd Ed." published by Kagakudojin.

For the biaxially oriented polyester films of the invention, the propagating tear strength of the film, converted to 5 μm thickness, in the transverse direction should preferably in the range of 0.7 g or more and 1.8 g or less. For the invention, furthermore, the propagating tear strength in the transverse direction should more preferably in the range of 0.8 g or more and 1.5 g or less.

The polyester to be used for the invention should preferably be polyethylene terephthalate, as described above, and for the film of the invention in this case, at least either the ratio $R_1(=I_{MD}/I_{ND})$ of the peak intensity in the machine direction ($I_{MD}$) and that in the normal direction ($I_{ND}$) at 1615 cm$^{-1}$ measured by laser Raman scattering or the ratio $R_2(=I_{TD}/I_{ND})$ of the peak intensity in the transverse direction ($I_{TD}$) and that in the normal direction ($I_{ND}$) should preferably be 6 or more. The ratio $R_1(=I_{MD}/I_{ND})$ of the peak intensity in the machine direction ($I_{MD}$) and that in the normal direction ($I_{ND}$) at 1615 cm$^{-1}$ measured by laser Raman scattering and the ratio $R_2(=I_{TD}/I_{ND})$ of the peak intensity in the transverse direction ($I_{TD}$) and that in the normal direction ($I_{ND}$) are related to the intensity of orientation in the machine direction and the transverse direction, respectively. However, the 1615 cm$^{-1}$ Raman band used for the invention is attributed to the C=C stretching vibration (vC=C) of the benzene ring, and its intensity depends on the packing of benzene rings. For biaxially oriented film, in particular, the intensity depends significantly on factors other than the orientation. For the present invention, in order to produce film highly strengthened in all directions in the film plane, at least either of the intensity ratios for the machine direction and the transverse direction, $R_1$ and $R_2$, should preferably be 6 or more, more preferably 7 or more. For the production of magnetic recording media, in particular, it is further more preferable that the intensity ratio for the transverse direction, $R_2$, is 6 or more.

For biaxially oriented polyethylene terephthalate films of this invention, the refractive index in the normal direction ($n_{ZD}$) should preferably be in the range of 1.470 or more and 1.485 or less, and the planar orientation index ($f_n$) should preferably in the range of 0.175 or more or 0.195 or less. For the invention, if the refractive index in the normal direction ($n_{ZD}$) is more than 1.485 and the planar orientation index ($f_n$) is less than 0.175, elongational deformation will become likely to be caused during the travelling of magnetic tape by the stress applied on the tape, leading to shifts of tracks. If the refractive index in the normal direction ($n_{ZD}$) is less than 1.470 and the planar orientation index ($f_n$) is more than 0.195, the propagating tear strength of the film will be small, and tape breakage will become likely to occur. For the film of this invention, the refractive index in the normal direction ($n_{ZD}$) should more preferably be in the range of 1.473 or more and 1.482 or less, and the planar orientation index ($f_n$) should more preferably be in the range of 0.180 or more or 0.193 or less.

For biaxially oriented polyethylene terephthalate films of this invention, the density should preferably be in the range of 1.385 or more and 1.400 or less. For the film of this invention, if the density is less than 1.385, the structures in the film will not be fixed sufficiently, causing deterioration in the preservability of the tape, whereas if density is more than 1.400, the propagating tear strength of the film will be small, leading to frequent occurrence of tape breakage.

For biaxially oriented polyethylene terephthalate films of this invention, the heat shrinkage starting temperature should preferably be 70° C. or more and the heat shrinkage at the temperature of 80° C. should preferably be 0.5% or less from the viewpoint of the elongational deformation and preservability of the tape. It is more preferably that the heat shrinkage starting temperature is 75° C. or more and the heat shrinkage at the temperature of 80° C. is 0.3% or less. For the present invention, if the heat shrinkage starting temperature is less than 70° C. or if the heat shrinkage at the temperature of 80° C. is more than 0.5%, the dimensional stability will be likely to deteriorate, leading to thermal deformation being caused when the magnetic tape is heated by the heat of friction between the travelling magnetic tape and the recording head, or giving rise to deterioration in the preservability of the tape.

Biaxially oriented polyester films of this invention can serve favorably for the production of magnetic recording media, electrostatic capacitors, and thermal transfer ribbons, and their film thickness should preferably be in the range of 0.5–20 μm, depending on their use and purpose. For the production of magnetic recording media, they provide base film suited to high-density magnetic recording tapes, especially to those for data storage. The magnetic recording density should preferably be 30 GB (gigabytes) or more, more preferably 70 GB or more, further more preferably 100 GB or more. The film thickness should preferably be in the range of 1 μm or more and 15 μm or less for the production of conventional magnetic recording media, in the range of 2 μm or more and 10 μm or less for the production of coat-type magnetic recording media for data storage, and in the range of 3 μm or more and 9 μm or less for the production of evaporation-type magnetic recording media for data storage.

For the production of electrostatic capacitors, biaxially oriented polyester films of the present invention should preferably be 0.5–15 μm in thickness, which leads to high stability of dielectric breakdown voltage and dielectric properties.

For the production of thermal transfer ribbons, biaxially oriented polyester films of the present invention should preferably be 1–6 μm in thickness, which permits highly fine printing without suffering wrinkles or causing uneven printing, excessive ink transfer, etc.

For the production of base paper for thermosensitive stencil printing, biaxially oriented polyester films of this invention should preferably be 0.5–5 μm in thickness, which permits easy perforation at low energy, variation of perforation diameters depending on the energy level, and high-quality color printing using several plates.

For biaxially oriented polyethylene terephthalate films of this invention, the surface roughness (Ra) of the magnetic recording surface should preferably be in the range of 0.2–15 nm to reduce the distance between the magnetic head and the magnetic tape to enhance the electromagnetic conversion properties. The surface roughness (Ra) of the travelling surface, which is opposite to the magnetic recording surface, should preferably be in the range of 5–30 nm from the viewpoint of the handling of base film and the winding of film to produce a roll. Controlling the roughness of the two surfaces separately is highly desirable to ensure both high travelling performance and high electromagnetic conversion properties of the tape. This can be achieved by co-extruding two resin materials consisting of polyester and particles with different diameters to produce a laminate film consisting of two or more layers. Thin layer may be further added to the magnetic recording surface to produce a three-layered film. For a two-layered film, the ratio (A/B) of the thickness of the layer that works as the magnetic recording surface (A) and the thickness of the layer that works as the travelling surface (B) should preferably be in the range from 80/1 to 3/1.

Polyester films of the present invention may contain inorganic or organic particles, and other various additives including oxidation inhibitor, antistatic agent, and crystal nucleation agent. They may contain a small amount of other resins such as a copolyester resin whose backbone chain contains mesogenic groups (liquid crystal-forming structure unit).

Such copolyester resins whose backbone chain contains mesogenic groups include copolyester produced from a monooxy-monocarboxylic acid compound, aromatic dihydroxy compound, aromatic dicarboxylic acid, alkylene diol, etc. Such monooxy-monocarboxylic acid compounds include p-hydroxybenzoic acid and 6-hydroxy-2-naphthoic acid. Such aromatic dihydroxy compounds include 4,4'-dihydroxy biphenyl, hydroquinone, and 2,6-dihydroxy naphthalene. Such aromatic dicarboxylic acids include terephthalic acid, isophthalic acid, 4,4'-diphenyl dicarboxylic acid, 2,6-naphthalene dicarboxylic acid, and 1,2-bis (phenoxyl)ethane-4,4'-dicarboxylic acid. Such alkylene diols include ethylene glycol, and butanediol. The mole ratio (M/N) of the sum (M) of the quantities of the copolymerized monooxy-monocarboxylic acid compound and the copolymerized aromatic dihydroxy compound and the quantity (N) of the copolymerized alkylene diol should preferably be in the range from 80/20–50/50. Desirable copolyester to be added to polyethylene terephthalate film or polyethylene naphthalate film include those produced from hydroxybenzoic acid, 4,4'-dihydroxy biphenyl, ethylene glycol, terephthalic acid or 2,6-naphthalene dicarboxylic acid, etc. Their contents in the polyester film should preferably be in the range of 0.5–10.0 wt %.

The above-described inorganic particles include, but not limited to, such oxides as silicon oxide, aluminum oxide, magnesium oxide, and titanium oxide, such complex oxides as kaolin, talc, and montmorillonite, such carbonates as calcium carbonate, and barium carbonate, such sulfates as calcium sulfate, and barium sulfate, such titanates as barium titanate, and potassium titanate, and such phosphates as tribasic calcium phosphate, dibasic calcium phosphate, and monobasic calcium phosphate. Two or more of these may be used together to achieve a specific objective.

The above-described organic particles include, but not limited to, particles of such vinyl materials as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene. Any other particles may be used if at least a part of the particles are fine polymer particles that are insoluble to the polyester. Said organic particles should preferably be spherical and have a uniform diameter distribution in order to ensure high slipperiness and uniform protrusions formed over the film surface.

The desired diameter, content, and shape of the particles depend on the use and objective. Generally, however, their average diameter should preferably be in the range of 0.01 μm or more and 2 μm or less, and their content should preferably be in the range of 0.002 wt % or more and 2 wt % or less.

The above description shows that biaxially oriented polyester films with a specific structure and properties can serve excellently as base film for high density magnetic recording tape because they can reduce tape breakage and enhance the travelling durability and preservability. Desirable methods to produce these biaxially oriented polyester films of this invention are described below. Needless to say, the description given below does not place any limitations on the present invention unless it extends beyond the scope of the invention.

The machine direction, abbreviated as MD, may also be called the longitudinal direction in relation to the stretching process for film formation, while the transverse direction, abbreviated as TD, may also be called the transverse direction in relation to the stretching process for film formation.

The biaxially oriented polyester films of the present invention consist of a melt-molded polyester resin sheet that is oriented by sequential biaxial stretching and/or simultaneous biaxial stretching in the machine direction and transverse direction. Such a sheet is produced by carrying out biaxial stretching several times at different temperatures to achieve a very high orientation. Desirable production methods include, but not limited to, production methods (I) and (II) described above.

For production method (I), sequential biaxial stretching of polyethylene terephthalate (hereafter, referred to as PET) film is described below as an example.

Pellets of polyethylene terephthalate (inherent viscosity: 0.65 dl/g, glass transition temperature Tg: 75° C., melting point: 255° C.) is dried adequately in a vacuum, fed to an extruder maintained at a temperature of 270–300° C., and extruded through a T-die to produce a sheet. This molten sheet is allowed to adhere over a drum with a cooled surface of 10–40° C. using static electricity to ensure close contact, so that substantially amorphous non-stretched cast film is obtained. During this procedure, the refractive index in the machine direction and that in the transverse direction should preferably be controlled in the range of 1.570–1.575 while the crystallinity should preferably be maintained at 1.5% or less, more preferably 1.0% or less, in order to produce a film of the present invention. Furthermore, the ratio (A/B) of the maximum thickness of the edge part of the non-stretched film (A) and the thickness at the center of width (B) should preferably be in the range of 2.0–6.0, more preferably 3.0–5.0 so that subsequent stretching will be performed favorably.

Required conditions (stretching temperature, degree of stretching) for the sequential biaxial stretching of this non-stretched film must be identified so that the film will become 0–0.02 in birefringence ($\Delta n$) and 6% or less in crystallinity after the sequential biaxial stretching in the machine direction and transverse direction. For the sequential biaxial stretching to be performed favorably, the non-stretched film should be introduced to a group of heated metallic rolls to achieve 1.5–2.5 times stretching in the machine direction at a temperature in the range of (polyester's glass transition temperature Tg+15)° C. to (Tg+45)° C., more preferably (polyester's glass transition temperature Tg+25)° C. to (Tg+45)° C. (MD stretching 1). This stretching should preferably be carried out in two steps to achieve the required degree of stretching. The film is held by tenter clips at its ends, brought to a tenter, pre-heated, and stretched at a draw ratio of 1.5–2.5 times in the transverse direction at a temperature in the range of (polyester's glass transition temperature Tg+15)° C. to (Tg+45)° C., more preferably (polyester's glass transition temperature Tg+25)° C. to (Tg+45)° C. (TD stretching 1) to produce a film that should preferably have a birefringence of 0–0.02, more preferably 0–0.01, further more preferably 0–0.005, and a crystallinity of 6% or less, more preferably 3% or less, further more preferably 2% or less, as determined by a density-based technique. The refractive index of this film in the machine direction and transverse direction should preferably be 1,590 or less, more preferably 1,580 or less. Thus, it is preferred that stretching to 1.5–2.5 times in the machine direction and the transverse direction is carried out at a temperature where orientation and crystallinity are not increased significantly by this stretching. Such stretching disentangles the polymer chains to permit the formation of a structure consisting of oriented benzene rings stacked in twos or threes in the vertical direction (stacking structure). The formation of this structure followed by re-stretching in several steps is desirable to produce a film disclosed herein. The degree of stretching in the machine direction referred to here is defined as the ratio of the film speed after the stretching to that before the stretching in the stretching process, whereas several lines extended in the machine direction and aligned with each other at equal intervals in the transverse direction are provided on the film before the stretching and the increased distance between the lines are measured after the stretching to determine the degree of stretching in the transverse direction that is defined as the ratio of the distance between the lines after the stretching to that before the stretching.

Following TD stretching 1, the film is stretched again in the transverse direction at a temperature below the stretching temperature of TD stretching 1, followed by further stretching in the machine direction. The stretching in the transverse direction should preferably be carried out up to 3–5 times in the transverse direction at a temperature in the range of (Tg−15)° C. to (Tg+25)° C., more preferably (Tg−15)° C. to (Tg+10)° C. (TD stretching 2). Since such stretching at a temperature below (Tg+10)° C. causes a small degree of necking (pseudo-necking stretching), the draw ratio of stretching should preferably be set to 3 times or more. If the draw ratio of TD stretching 2 is less than 3 times, the film is likely to become less uniform in thickness, which should be avoided carefully. To ensure high-degree stretching at a temperature near Tg, it is important that said MD stretching 1 and TD stretching 1 be carried out under said desired temperature and stretching degree conditions to provide a biaxially stretched film having such desired properties as described above.

For the subsequent second longitudinal stretching, the film is introduced to a group of heated metallic rolls (with hard, chrome plated, mirror finished surface) and re-stretched in the machine direction at a draw ratio of 2–6 times preferably at a temperature in the range of (Tg−25)° C. to (Tg+85)° C. (MD stretching 2). More preferably, second longitudinal stretching at a draw ratio of 3–6 times (MD stretching 2) should be performed in several steps, specifically, at a temperature in the range of (Tg−15)° C. to (Tg+10)° C. in the first step and at a temperature in the range of more than (Tg+10)° C. up to (polyester's melting point Tm+85)° C. in the subsequent steps. When such multiple-step longitudinal stretching is performed, the degree of stretching in the first step that is carried out at a temperature in the range of (Tg−15)° C. to (Tg+10)° C. should be in the range of about 70% to 95% of the total draw ratio in the MD stretching 2 process. It is more preferred that this draw ratio of stretching achieved by said machine-direction re-stretching in the fist step that is performed at a temperature of (Tg−15)° C. to (Tg+10)° C. be achieved in two or more divided steps.

Subsequently, this biaxially oriented film may be further re-stretched in the transverse direction. For this second stretching, the biaxially stretched film is held by tenter clips at its ends, brought to a tenter, pre-heated, and stretched at a draw ratio of 1.05–3 times in the transverse direction at a temperature in the range from the temperature of MD stretching 2 to (Tm−20)° C., preferably stretched in one step or multiple steps in the transverse direction at a draw ratio of 1.2–2.5 times with the temperature gradually increased in the range from more than (Tg+10)° C. to (polyester's melting point Tm−45)° C. (TD stretching 3). The temperature for TD stretching 3 should preferably be in the range of (Tm−120)° C. to (Tm−45)° C. where the crystallinity of the film starts to increase. This film is then heat-treated in the temperature range of (Tm−75)° C. to (Tm−35)° C., and subsequently relaxed in the transverse direction and/or machine direction during the cooling from the heat treatment temperature. The relaxation treatment should preferably be performed in two or more steps (for example at 180–130° C. and 130–90° C.). Relaxation in the transverse direction may be achieved favorably by gradually decreasing the distance between the guide rails for the tenter clips while relaxation in the machine direction may be achieved favorably by gradually decreasing the distance between the clips that hold the edges of the film.

This film may be subjected to further heat treatment in the temperature range of (Tg−30)° C. to (Tg+110)° C. Favorable methods for this second heat treatment include the use of a heating oven, and the use of several heating rolls. In a favorable heat treatment process using a heating oven, for example, a tensile stress of 2 MPa or more is applied to a film with edges (thicker parts formed at the ends of the film during its production process) to pull the edge in the machine direction, and the film is stretched in the transverse direction by the expanding apparatus (expanding roll, etc.) provided at the entrance of the heating oven, followed by heat treatment on the nip rollers provided at both sides of the heating oven. In this step, the running speed of the nip roll at the rear side may be set lower than that of the nip roll at the front side to achieve relaxation in the machine direction. When several heating rolls are used for the second heat treatment, nip rolls may be provided at both sides of the group of heating rolls, and the heat treatment is carried out via the nip rolls. In this step, the running speed of the nip roll at the rear side may be set lower than that of the nip roll at the front side to achieve relaxation in the machine direction.

After trimming the edges, the film produced may be slit into tapes which may be wound into a roll and subjected to aging treatment at a temperature of (Tg−30)° C. to (Tg+30)° C. for 1–10 days.

Examples of production method (II) using simultaneous biaxial stretching are described below. When simultaneous biaxial stretching is applied, the basic film production principles and stretching conditions are the same as those for the sequential biaxial stretching described above, and the sequential biaxial stretching process may be replaced partially or entirely with simultaneous biaxial stretching. For example, 1) MD stretching 1 and TD stretching 1 are carried out by simultaneous biaxial stretching, with the rest of the process being performed by sequential stretching; 2) MD stretching 1, TD stretching 1, and the first step of TD stretching 2 and MD stretching 2 are carried out by simultaneous biaxial stretching, with the rest of the process being performed by sequential stretching; 3) MD stretching 1 and TD stretching 1 are carried out by sequential biaxial stretching, followed by the first step of TD stretching 2 and MD stretching 2, the second step of MD stretching 2, and TD stretching 3 performed by simultaneous biaxial stretching; 4) MD stretching 1, TD stretching 1,TD stretching 2, and the first step of MD stretching 2 are carried out by sequential biaxial stretching, followed by the second step of MD stretching 2, and TD stretching 3 performed by simultaneous biaxial stretching; 5) MD stretching 1, TD stretching 1, the first step of TD stretching 2 and MD stretching 2, the second and subsequent steps of MD stretching 2, and TD stretching 3 , i.e., the entire stretching process, are carried out by simultaneous biaxial stretching; 6) MD stretching 1 and TD stretching 1 are carried out by sequential biaxial stretching, and subsequently the first step of TD stretching 2 and MD stretching 2 are carried out by simultaneous biaxial stretching, followed by the second and subsequent steps of MD stretching 2, and TD stretching 3 being carried out by sequential biaxial stretching; or 7) MD stretching 1 and TD stretching 1 are carried out by simultaneous biaxial stretching, and subsequently TD stretching 2 and MD stretching 2 are carried out by sequential biaxial stretching, followed by the rest of the process being carried out by simultaneous biaxial stretching.

For the present invention, the fifth procedure, where MD stretching 1, TD stretching 1, the first step of TD stretching 2 and MD stretching 2, the second and subsequent steps of MD stretching 2, and TD stretching 3, i.e., the entire stretching process, are carried out by simultaneous biaxial stretching, is preferred.

A process where the entire stretching process is carried out by simultaneous biaxial stretching is described below.

Substantially amorphous non-stretched cast film is produced according to the same procedure as described for film production by sequential biaxial stretching. During this procedure, the refractive index in the machine direction and that in the transverse direction should preferably be controlled in the range of 1.570–1.575 while the crystallinity should preferably be maintained at 1.5% or less, more preferably 1.0% or less, in order to produce a film of the present invention. Furthermore, the ratio (A/B) of the maximum thickness of the edge part of the non-stretched film (A) and the thickness at the center of width (B) should preferably be in the range of 2.0–6.0, more preferably 3.0–5.0, further more preferably 3.0–4.0, so that subsequent stretching will be performed favorably.

The cast film, with its edges held by tenter clips, is placed in a simultaneous biaxial stretching machine in which it is stretched at a temperature of (Tg+25)° C. to (Tg+45)° C. and an area draw ratio of 2–7 times, preferably up to 1.5–2.5 times in both the machine direction and transverse directions. The refractive index in the machine direction and the transverse direction of this simultaneous biaxially stretched film should preferably be 1.590 or less, more preferably 1.580 or less. Its birefringence should preferably be 0–0.02, more preferably 0–0.01, further more preferably 0–0.005. The crystallinity as determined from density measurement should preferably be 6% or less, more preferably 3% or less, further more preferably 2% or less, to provide film of the present invention. Subsequently, the biaxially stretched film is further subjected to simultaneous biaxial stretching at a temperature of (Tg−15)° C. to (Tg+10)° C. and an area draw ratio of 4–16 times, preferably up to 3–5 times in each of the machine direction and transverse directions. Subsequently, this film is further subjected to one-step or multiple-step simultaneous biaxial stretching at a temperature of more than (Tg+10)° C. to (polyester's melting point Tm−45)° C. and an area draw ratio of 1.5–5 times, preferably at a draw ratio of 1.2–2.5 times in each of the machine direction and transverse directions. The temperature for the simultaneous biaxial stretching in this process should preferably be in the range of (Tm−120)° C. to (Tm−45)° C. where the crystallinity of the film starts to increase. This film is then heat-treated in the temperature range of (Tm−75)° C. to (Tm−10)° C., preferably (Tm−70)° C. to (Tm−35)° C., and subsequently relaxed in the transverse direction and machine direction during the cooling from the heat treatment temperature. The relaxation treatment should preferably be performed in two or more steps (for example at 180–130° C. and 130–90° C.). Relaxation in the transverse direction may be achieved favorably by gradually decreasing the distance between the guide rails for the tenter clips while relaxation in the machine direction may be achieved favorably by gradually decreasing the distance between the tenter clips that hold the edges of the film.

A preferred machine for the simultaneous biaxial stretching for the present invention is the simultaneous biaxial stretching tenter that uses a linear motor to move the tenter clips in the machine direction. The shape of the clip's face that comes in contact with the film should preferably be such that the ratio ($L_{MD}/L_{TD}$) of the length in the machine direction ($L_{MD}$) to the width in the transverse direction ($L_{TD}$) is in the range of 3–15, which is preferred to achieve uniform stretching in the machine direction at the end of the film. The temperature of the clips that hold the edges of the film for stretching should preferably be in the range of (Tg+15)° C. to (Tg+50)° C. to ensure uniform stretching in the machine direction at the end of the film. The clips pass through the tenter while being heated in the pre-heating zone, stretching zone, and heat treatment zone, come out of the tenter, and move around the oven to return to the entrance of the tenter, and the temperature of the clips referred to above is defined as that temperature measured prior to holding the edges of the film. The temperature of the clips is controlled by adjusting the cooling air flow rate and the length of the cooling portion in the path for return to the entrance. This temperature becomes stationary after 3–5 hours of continuous operation under the prescribed film production conditions.

For the present invention, the polyester film may be coated with a coating material prior to or after the stretching of the film to provide special surface properties for easy adhesion, high slipperiness, easy mould release, and high antielectricity.

The biaxially stretched polyester films of this invention serve favorably as material for magnetic recording media as well as electrostatic capacitors, thermal transfer ribbons, and heat-sensitive base paper for stencil printing.

[Methods used for evaluation of properties]
(1) Circumferential Half-width of the Diffraction Line from Film's crystal plane determined by wide angle X-ray diffractometry This was determined by diffractometry under the following conditions using an X-ray diffractometer.

| | |
|---|---|
| X-ray diffractometer | manufactured by Rigakudenki, model 4036A2 (sealed off filament X-ray tube type) |
| X-ray source | CuKα ray (used with Ni filter) |
| Output | 40 kV, 20 mA |
| Goniometer | manufactured by Rigakudenki Corporation |
| Slit | 2 mm φ −1° − 1° |
| Detector | scintillation counter |
| Counter-recorder | manufactured by Rigakudenki Corporation, model RAD-C |

A stack of specimens of a size of 2 cm×2 cm aligned in the same direction and the counter were placed at the diffraction line from the crystal plane determined from 2θ/θ scanning, and the specimen stack was rotated within the plane to provide the circumferential profile (β scanning). The peak's half-width (deg) was determined from the peak profile obtained from the β scanning assuming that the bottoms at both sides of the peak constitute the background.

(2) Crystal Size Determined from Wide Angle X-ray Diffractometry

This was determined by the transmission method under the following conditions using an X-ray diffractometer.

| | |
|---|---|
| X-ray diffractometer | manufactured by Rigakudenki, model 4036A2 |
| X-ray source | CuKα ray (used with Ni filter) |
| Output | 40 kV, 20 mA |
| Goniometer | manufactured by Rigakudenki Corporation |
| Slit | 2 mm φ −1° − 1° |
| Detector | scintillation counter |
| Counter-recorder | manufactured by Rigakudenki Corporation, model RAD-C |

A stack of specimens of a size of 2 cm×2 cm aligned in the same direction was treated in collodion ethanol solution into a lump, and subjected to wide angle X-rays diffraction observation to provide 2θ/θ intensity data, and the crystal size was calculated from the half-width of planes in different directions using the Scherrer's equation given below. The crystal size represents the size in the principal orientation axis.

$$\text{Crystal size } L(\text{Å}) = K\lambda/\beta_o \cos \theta_B$$

K: constant (=1.0)
λ: wave length of X-ray (=1.5418A)
$\theta_B$: Bragg angle
$\beta_o = (\beta_E^2 - \beta_I^2)^{1/2}$
$\beta_E$: apparent half-width (measured)
$\beta_I$: apparatus constant (=1.046×10$^{-2}$)

(3) Young's Modulus

Measurement was performed according to the procedure specified in ASTM-D882 using an Instron type tensile tester. The conditions for measurement are given below.

| | |
|---|---|
| Measuring apparatus | automatic film strength measuring apparatus, produced by Orientec Corporation, Model "Tensilon AMF/RTA-100" |
| Sample size | width 10 mm × effective specimen length 100 mm |
| Stretching speed | 200 mm/min |
| Measuring environment | temperature 23° C., humidity 65% RH |

(4) Creep Compliance

A specimen of a width of 4 mm was cut off, and set in TMA "TM-3000" produced by Shinku Riko Corporation with a heating control unit "TA-1500" so that the effective specimen length was 15 mm.

A load of 28 MPa was applied to the specimen, which was left for 30 minutes under the conditions of 50° C. and 65% RH, and the elongation of the film was measured. The film's elongation (percentage, represented as (ΔL)) was determined with an NEC PC-9801 personal computer via a Canopus Co., Ltd. AD converter ADX-98E, and the creep compliance was determined from the following equation. Creep compliance (GPa$^{-1}$)=(ΔL/100)/0.028

(5) Orientation of Film Determined from Laser Raman Scattering

The measuring conditions used for the laser Raman spectrometry are described below.

| | |
|---|---|
| Apparatus | Jobin Yvon, Ramanor U-1000 |
| Micro-Raman | measurement configuration; 180° scattering specimen support; solid |
| Light source | NEC GLG3300, Ar+ laser, wave length 515 nm |
| Spectroscope | configuration; 1 m, Czerny-Turner type Double Monochromator Diffraction grating; Plane Holographic, 1800 g/mm, 110 × 110 mm Dispersion; 9.23 cm$^{-1}$ /mm Inverse light removal rate; $10^{-14}$ (20 cm$^{-1}$) |
| Detector | PM RCA31034, Hamamatsu Denshi 943-02 |

The film used for the measurement was embedded in polymethyl methacrylate, and wet-polished. The direction of the cross section was set to be parallel to the transverse direction. The central part was used for measurement. Ten measurements were made at slightly different positions, and their average was calculated. The 1615 cm$^{-1}$ band intensity for polarization parallel in the machine direction ($I_{MD}$) and the 1615 cm$^{-1}$ band intensity for polarization parallel in the normal direction ($I_{ND}$) were measured to determine the ratio $R_1$ ($R_1=I_{MD}/I_{ND}$), which represents the degree of orientation. In addition, the 1615 cm$^{-1}$ band intensity for polarization parallel in the transverse direction ($I_{TD}$) and the 1615 cm$^{-1}$ band intensity for polarization parallel in the normal direction ($I_{ND}$) were measured to determine the ratio $R_2$ ($R_2=I_{TD}/I_{ND}$), which represents the degree of orientation.

(6) Propagating Tear Strength

Measurement was performed in accordance with ASTM-D1922 using a light weighted tearing tester (Toyo Seiki Kogyo Co.,Ltd.). A 13 mm cut was made into a 64×51 mm specimen, and then the remaining 51 mm portion was torn, followed by reading the indication.

(7) Refractive Index and Planar Orientation Index ($f_n$)

The refractive index was measured in accordance with the method specified in JIS-K7105 using sodium D ray as light source and using an Atago Type 4 Abbe refractometer. Methylene iodide was used as mounting liquid, and the measurement was performed at 23° C. and 65% RH.

The planar orientation index ($f_n$) was calculated from the refractive index measurements using the following equation.

Planar orientation index=$(n_{MD}+n_{TD})/2-n_{ZD}$ $n_{MD}$: refractive index in the machine direction $n_{TD}$: refractive index in the transverse direction $n_{ZD}$: refractive index in the normal direction (8) Birefringence A Berek compensator combined with a NIKON polarization microscope was used to determine the film's retardation (R), and the birefringence (Δn) was calculated by the following equation.

Δn=R/d

R: retardation (μm)

d: film thickness (μm)

(9) Density and Crystallinity

The density of film was measured with the density gradient method specified in JIS-K7112 using aqueous sodium bromide solution. This density was used in combination with the crystal density and amorphous density of polyester to calculate the crystallinity by the following equation.

Crystallinity (%)=[(film density−amorphous density)/(crystal density−amorphous density)]×100

For PET, amorphous density: 1.335 g/cm$^3$ crystal density: 1.455 g/cm$^3$

(10) Heat Shrinkage Starting Temperature

A 4 mm wide specimen cut out from the film was set in the TMA equipment used in paragraph (4) so that the effective specimen length was 15 mm. With a load of 1 g applied, the specimen was heated up to 120° C. at a heating rate of 2° C./min., followed by determination of the shrinkage (%). The data were recorded to provide graphs of temperature and shrinkage. The temperature at the point where the shrinkage curve departed from the baseline (0%) was read, and this reading was used as the heat shrinkage starting temperature.

(11) Heat Shrinkage

Measurement was carried out in accordance with JIS-C2318.

Sample size: width 10 mm, marked line interval 200 mm

Measuring condition: temperature 80° C., processing time 30 min, unloaded condition 80° C. heat shrinkage was calculated by the following equation.

Heat shrinkage (%)=$[(L_0-L)/L_0]\times 100$ $L_0$: marked line interval before heating L: marked line interval after heating

(12) Glass Transition Temperature Tg and Melting Point Tm

A differential scanning calorimeter, Seiko Instruments Inc. Robot DSC-RDC220, was used with a data analyzer, Seiko Instruments Inc. Disk Session SSC/5200. A 5 mg specimen was taken, heated from room temperature to 280° C. at a heating rate of 20° C./min., maintained at the temperature for 5 min., quenched with liquid nitrogen, and heated again from room temperature to 280° C. at a heating rate of 20° C./min., and the heat curve obtained was used to determine Tg and Tm.

(13) Center Line Average Surface Roughness (Ra)

Measurement was carried out with a Kosaka Laboratory Ltd. ET-10 high-precision thin-film step measuring machine, and the center line average surface roughness (Ra) was determined according to JIS-B0601. The measurement was performed under the conditions of a tracer tip diameter of 0.5 μm, tracer pressure of 5 mg, measuring length of 1 mm, and a cut-off of 0.08 mm.

(14) Frequency of Film Breakage

For the process for producing biaxially oriented polyester film, the frequency of film breakage was determined according to the following criteria.

⊚: Breakage from edge does not occur for 48 hours or more

○: Breakage from edge does not occur for 24 hours or more

Δ: Breakage from edge does not occur for 7 hours or more

X: Film production cannot be continued for 6 hours or more due to film breakage.

Film specimens falling under ⊚, ○, or Δ according to the above criteria were judged "accepted" from the viewpoint of film forming stability and yield.

(15) Surface Damage During High-speed Travelling

Film was slit into ½ inch wide strip specimens, which were allowed to run on a guide pin (surface roughness Ra=100 nm) in a tape running test machine (travelling speed 250 m/min., number of times of travelling 1, winding angle 60°, travelling tension 90 g). After the travelling of the film had finished, the guide pin was observed visually, and the film was judged excellent (○) if no debris was found on the pin, good (Δ) if a small amount of debris was found on the pin, and no good (X) if a large amount of debris was found on the pin. Being excellent (○) is desired, but films judged good (Δ) can serve for practical uses.

(16) Electromagnetic Conversion Property (C/N)

The surface of specimens of films of the present invention was coated with a magnetic paint and a non-magnetic paint (coating material) with the following compositions using an extrusion coater (upper coat: magnetic, 0.1 μm thick; lower coat: non-magnetic, varied thickness), magnetically ordered, and dried. Then the opposite surface was coated to form a back coat with the following composition, followed by calendering in a small test calendering machine (steel/steel roll, 5 steps) at a temperature of 85° C. and a linear load of 200 kg/cm, and curing at 60° C. for 48 hours. Another 8 mm wide strip specimen was cut off from the original film to form a pancake, from which a 200 m tape was taken and set in a cassette to produce a videotape cassette.

A commercial Hi8 videotape recorder (SONY EV-BS3000) and the C/N (carrier/noise ratio) for 7 MHz+1 MHz was measured.

| (Composition of magnetic paint) | |
|---|---|
| Ferromagnetic metal powder: | 100 parts by weight |
| Sodium sulphonate - modified vinyl chloride copolymer: | 10 parts by weight |
| Sodium sulphonate - modified polyurethane: | 10 parts by weight |
| Polyisocyanate: | 5 parts by weight |
| Stearic acid: | 1.5 parts by weight |
| Oleic acid: | 1 part by weight |
| Carbon black: | 1 part by weight |
| Alumina: | 10 parts by weight |
| Methyl ethyl ketone: | 75 parts by weight |
| Cyclohexanone: | 75 parts by weight |
| Toluene: | 75 parts by weight |
| (Composition of non-magnetic lower layer) | |
| Titanium oxide: | 100 parts by weight |
| Carbon black: | 10 parts by weight |
| Sodium sulphonate - modified vinyl chloride copolymer: | 10 parts by weight |
| Sodium sulphonate - modified polyurethane: | 10 parts by weight |
| Methyl ethyl ketone: | 30 parts by weight |
| Methyl isobutyl ketone: | 30 parts by weight |
| Toluene: | 30 parts by weight |
| (Composition of back coat) | |
| Carbon black (average grain size 20 nm): | 95 parts by weight |
| Carbon black (average grain size 280 nm): | 10 parts by weight |
| α alumina: | 0.1 part by weight |
| Zinc oxide | 0.3 part by weight |
| Sodium sulphonate - modified polyurethane: | 20 parts by weight |
| Sodium sulphonate - modified vinyl chloride copolymer: | 30 parts by weight |
| Cyclohexanone: | 200 parts by weight |
| Methyl ethyl ketone: | 300 parts by weight |
| Toluene: | 100 parts by weight |

(17) Properties of Heat Transfer Ribbon for Color Printing

The film obtained was coated with ink layers of cyan, magenta, and yellow, to produce a printer ribbon, which was used with a variable dot type heat transfer color printer to print a standard color pattern, followed by visual evaluation of its gradient. Wrinkles in the ribbon were also checked based on the visual observation of the uniformity of the printed part.

(18) Evaluation of Capacitor Properties

A. Dielectric Characteristics

Aluminum was vapor-deposited up to a thickness of 600–1000 Å over a 18 mm-diameter circular part of both sides of the film to produce a specimen, which was left in an environment of a temperature of 20±5° C. and a relative humidity of 65±5% for 48 hours or more. A dielectric characteristics measuring machine, TA Instruments DEA-2970, was used to determine the temperature dependence of dielectric loss tangent at a frequency of 1 kHz and heating rate of 2° C./min., and specimens were judged "good" if they had a dielectric loss tangent of 1.3% or less at the temperature of 105° C.

B. Dielectric Breakdown Voltage

Film free of metal deposition is used as specimen for evaluation which was performed according to JIS-C2319.

A rubber sheet with a Shore hardness of 60° and a thickness of about 2 mm is spread over a metal sheet of an appropriate size, which is provided with a stack of 10 sheets of aluminum foil of a thickness of 6 μm to serve as lower electrode and a 8 mm-diameter brass cylinder of about 50 g having a smooth, flawless bottom with its 1 mm peripheral part rounded to serve as upper electrode. Prior to the test, the specimen was left in an environment of a temperature of 20±5° C. and a relative humidity of 65±5% for 48 hours or more. The specimen was placed between the upper electrode and the lower electrode in an environment of a temperature of 20±5° C. and a relative humidity of 65±5%, and a DC power source was used to apply a DC voltage between the electrodes, which was increased from 0V at a rate of 100 V/sec until dielectric breakdown took place. A total of 50 specimens were tested. The dielectric breakdown voltage of each specimen was divided by its thickness, and its average was calculated. Specimens with an average of 400 V/μm or more were judged "accepted".

(19) Travelling Durability and Preservability of Magnetic Tape

One surface of film of the present invention was coated with a magnetic paint with the following composition up to a thickness of 2.0 μm, magnetically ordered, and dried. Then, the other surface was coated with a back coat layer with the following composition, followed by calendering and curing at 60° C. for 48 hours. Another ½ inch wide strip specimen was cut off from the original film and processed into a magnetic tape, from which a 200 m portion was taken and incorporated in a cassette to produce a videotape cassette.

| (Composition of magnetic paint) | |
|---|---|
| Ferromagnetic metal powder: | 100 parts by weight |
| Modified vinyl chloride copolymer: | 10 parts by weight |
| Modified polyurethane: | 10 parts by weight |
| Polyisocyanate: | 5 parts by weight |
| Stearic acid: | 1.5 parts by weight |
| Oleic acid: | 1 part by weight |
| Carbon black: | 1 part by weight |
| Alumina: | 10 parts by weight |
| Methyl ethyl ketone: | 75 parts by weight |
| Cyclohexanone: | 75 parts by weight |
| Toluene: | 75 parts by weight |
| (Composition of back coat) | |
| Carbon black (average grain size 20 nm) | 95 parts by weight |
| Carbon black (average grain size 280 nm): | 10 parts by weight |
| α alumina: | 0.1 part by weight |
| Modified polyurethane: | 20 parts by weight |
| Modified vinyl chloride copolymer: | 30 parts by weight |
| Cyclohexanone: | 200 parts by weight |
| Methyl ethyl ketone: | 300 parts by weight |
| Toluene: | 100 parts by weight |

The tape was allowed to run for 100 hours in an IBM "Magstar 3590" MODEL B1A tape drive, and its travelling durability was evaluated according to the following criteria.

○: free from elongation and bending at tape end, and no surface damage.

Δ: free from elongation and bending at tape end, but a small amount of surface damage found.

X: suffering elongation at part of tape end, tangle-like deformation, and surface damage After recording data on the tape in the video cassette using the IBM "Magstar 3590" MODEL B1A tape drive, the video cassette was left in an environment of a temperature of 40° C. and a relative humidity of 80% for 100 hours, and subsequently data were reproduced to evaluate the preservability of the tape.

○: no shift of tracks, normal reproduction

Δ: no changes in tape width, part of data not reproduced

X: some changes in tape width, data not reproduced

EXAMPLES

The present invention will be explained in more detail in reference to examples.

Example 1

Pellets of polyethylene terephthalate (intrinsic viscosity 0.65) produced by a known method were vacuum-dried at 180° C. for 3 hours, supplied to an extruder heated at 280° C., and melt-extruded through a T-die into a sheet. The sheet was put over a cooling drum with a surface temperature of 25° C. using electrostatic force to ensure their close contact, so that the sheet would be cooled to solidify into a substantially non-oriented film. This film was stretched under the conditions given in Table 1. It was first stretched in the machine direction in a longitudinal stretching machine consisting of several rolls using the differences among their circumferential speeds for stretching (MD stretching 1), then it was stretched in the transverse direction in a stenter (TD stretching 1), stretched again in the stenter for second transverse stretching (TD stretching 2), stretched again in the machine direction in the roll stretching machine (MD stretching 2), further stretched in the transverse direction in the stenter (TD stretching 3), heat-treated, cooled to room temperature, followed by the trimming of the film edge to produce biaxially stretched film with a thickness of 10.1 μm. Table 1 shows the film production conditions, and the frequency of film breakage, while Table 2 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 3 shows the resultant film's Young's modulus, circumferential half-width of the diffraction line, crystal size, diagonal Young's modulus, propagating tear strength in the width direction, refractive index in the normal direction, planar orientation index, and density, while Table 4 gives its creep compliance, heat shrinkage starting temperature, heat shrinkage at 80° C., and peak intensity in laser Raman scattering (R). The properties of the film biaxially stretched in the machine direction and the transverse direction were in the required range for the present invention, indicating that the film obtained was high in strength in both the machine direction and the transverse direction, strength in all directions within the film plane, deformation resistance under load, and dimensional stability, as well as stability during the film production process.

TABLE 1

| | | MD stretching 1 | | TD stretching 1 | | TD stretching 2 | | MD stretching 2 | | TD stretching 3 | | Heat treatment | Total draw | Breakage |
|---|---|---|---|---|---|---|---|---|---|---|---|---|---|---|
| | Material | Temp. (° C.) | Ratio (times) | Temp. (° C.) | Ratio (times) | Temp. (° C.) | Ratio (times) | Temp. (° C.) | Ratio (times) | Temp. (° C.) | Ratio (times) | temp. (° C.) | ratio (times) | frequency |
| Example 1 | PET | 100 | 2.0 | 105 | 2.0 | 75 | 3.6 | 80 | 4.0 | 135 | 1.3 | 200 | 75 | ⊚ |
| Example 2 | PET | 105 | 2.0 | 110 | 2.0 | 75 | 3.4 | 85 | 4.5 | 150 | 1.4 | 200 | 86 | ○ |
| Example 3 | PET | 115 | 2.5 | 105 | 2.0 | 75 | 3.4 | 90 | 5.5 | 170 | 1.2 | 200 | 112 | ○ |
| Example 4 | PET | 105 | 1.5 | 110 | 2.0 | 75 | 3.6 | 85 | 5.0 | 150 | 1.4 | 200 | 76 | ⊚ |
| Example 5 | PET | 100 | 2.0 | 105 | 2.0 | 75 | 3.6 | 80 | 4.0 | 135 | 1.3 | 200 | 75 | ⊚ |
| Example 6 | PET | 160 | 2.2 | 160 | 2.2 | 125 | 3.5 | 135 | 5.0 | 170 | 1.4 | 200 | 119 | ⊚ |
| Example 7 | PET | 165 | 2.5 | 160 | 2.2 | 125 | 3.5 | 140 | 5.0 | 170 | 1.2 | 200 | 115 | ○ |
| Example 8 | PET | 100 | 2.0 | 105 | 2.0 | 75 | 3.8 | 80 | 3.2 | 135 | 1.2 | 200 | 58 | Δ |
| Example 9 | PET | 100 | 2.0 | 105 | 2.0 | 75 | 3.4 | 80 | 3.0 | 135 | 1.2 | 200 | 49 | Δ |
| Comparative Example 1 | PET | 95 | 3.5 | 95 | 3.5 | — | — | — | — | 165 | 1.3 | 200 | 16 | ○ |
| Comparative Example 2 | PET | 110 | 3.0 | 100 | 3.6 | — | — | — | — | 200 | 1.5 | 200 | 16 | X |
| Comparative Example 3 | PET | — | — | 95 | 3.6 | — | — | 85 | 4.2 | — | — | 200 | 15 | ○ |
| Comparative Example 4 | PET | 95 | 2.8 | 95 | 2.2 | 95 | 1.8 | 130 | 1.3 | 175 | 1.3 | 200 | 18 | X |
| Comparative Example 5 | PET | 150 | 3.5 | 135 | 4.6 | — | — | — | — | 200 | 1.2 | 200 | 19 | X |

MD: machine direction
TD: transverse direction

TABLE 2

| | End thickness ratio (A/B) | Properties of non-stretched film | | | Properties of biaxially stretched film | | | |
|---|---|---|---|---|---|---|---|---|
| | | Refractive index | | Crystallinity | Refractive index | | | Crystallinity |
| | | MD | TD | (%) | MD | TD | Birefringence | (%) |
| Example 1 | 3.5 | 1.571 | 1.570 | 0.3 | 1.578 | 1.578 | 0 | 0.7 |
| Example 2 | 3.5 | 1.571 | 1.570 | 0.3 | 1.576 | 1.576 | 0 | 0.3 |
| Example 3 | 3.5 | 1.571 | 1.570 | 0.3 | 1.586 | 1.576 | 0.010 | 0.8 |
| Example 4 | 3.5 | 1.571 | 1.570 | 0.3 | 1.573 | 1.576 | 0.003 | 0.4 |
| Example 5 | 3.3 | 1.571 | 1.570 | 0.3 | 1.579 | 1.578 | 0.001 | 0.5 |
| Example 6 | 3.3 | 1.650 | 1.648 | 0.4 | 1.660 | 1.660 | 0 | 0.6 |
| Example 7 | 3.3 | 1.650 | 1.648 | 0.4 | 1.657 | 1.660 | 0.003 | 0.8 |
| Example 8 | 1.7 | 1.571 | 1.570 | 0.3 | 1.585 | 1.580 | 0.005 | 2.1 |
| Example 9 | 6.5 | 1.571 | 1.570 | 0.4 | 1.578 | 1.578 | 0 | 0.7 |
| Comparative Example 1 | 3.5 | 1.571 | 1.570 | 0.4 | 1.630 | 1.633 | 0.030 | 25 |
| Comparative Example 2 | 3.5 | 1.571 | 1.570 | 0.4 | 1.600 | 1.615 | 0.015 | 18 |
| Comparative Example 3 | 3.5 | 1.571 | 1.570 | 0.4 | 1.570 | 1.660 | 0.090 | 15 |
| Comparative Example 4 | 3.5 | 1.571 | 1.570 | 0.4 | 1.618 | 1.578 | 0.040 | 21 |
| Comparative Example 5 | 3.3 | 1.650 | 1.648 | 0.4 | 1.700 | 1.770 | 0.070 | 27 |

MD: machine direction
TD: transverse direction
Properties of biaxially stretched film: Properties of film after MD stretching 1 and TD stretching 1

TABLE 3

| | Young's modulus (GPa) | | Circumferential half-width of diffraction line (°) | Crystal size (Å) | Diagonal Young's modulus (GPa) | | Propagating tear strength in width direction (g/5 μm) | Refractive index in normal direction | Planar orientation index | Density (g/cm³) |
|---|---|---|---|---|---|---|---|---|---|---|
| | MD | TD | | | 45° | 135° | | | | |
| Example 1 | 5.3 | 8.8 | 75 | 62 | 6.3 | 6.5 | 0.8 | 1.478 | 0.187 | 1.391 |
| Example 2 | 5.8 | 8.0 | 80 | 65 | 6.5 | 6.7 | 0.9 | 1.476 | 0.192 | 1.392 |
| Example 3 | 8.8 | 6.8 | 77 | 64 | 7.5 | 7.7 | 1.0 | 1.474 | 0.193 | 1.392 |
| Example 4 | 5.3 | 8.8 | 73 | 65 | 6.5 | 6.6 | 0.9 | 1.478 | 0.187 | 1.390 |
| Example 5 | 5.4 | 8.8 | 75 | 67 | 6.6 | 6.8 | 0.9 | 1.477 | 0.189 | 1.392 |
| Example 6 | 8.8 | 9.8 | 70 | 53 | 9.2 | 9.1 | 0.7 | 1.493 | 0.253 | 1.347 |
| Example 7 | 10.1 | 8.3 | 75 | 55 | 9.0 | 8.9 | 0.7 | 1.490 | 0.251 | 1.348 |
| Example 8 | 5.4 | 7.2 | 65 | 60 | 6.0 | 6.1 | 0.8 | 1.481 | 0.183 | 1.392 |
| Example 9 | 5.5 | 7.5 | 73 | 58 | 6.4 | 6.5 | 0.8 | 1.479 | 0.184 | 1.390 |
| Comparative Example 1 | 4.4 | 6.8 | 45 | 41 | 5.1 | 5.2 | 0.7 | 1.493 | 0.168 | 1.392 |
| Comparative Example 2 | 4.4 | 9.8 | 43 | 43 | 5.5 | 5.8 | 0.6 | 1.492 | 0.170 | 1.390 |
| Comparative Example 3 | 6.8 | 4.4 | 42 | 40 | 5.2 | 5.3 | 0.8 | 1.489 | 0.171 | 1.390 |
| Comparative Example 4 | 9.8 | 4.4 | 47 | 41 | 5.7 | 5.9 | 0.8 | 1.488 | 0.173 | 1.389 |
| Comparative Example 5 | 5.8 | 11.8 | 45 | 40 | 7.5 | 8.0 | 0.4 | 1.498 | — | 1.349 |

MD: machine direction
TD: transverse direction

TABLE 4

| | Creep compliance (GPa⁻¹) | | Heat shrinkage starting temperature (° C.) | | Heat shrinkage at 80° C. (%) | | Peak intensity in laser Raman scattering (R) | |
|---|---|---|---|---|---|---|---|---|
| | MD | TD | MD | TD | MD | TD | $I_{MD}/I_{ND}$ | $I_{TD}/I_{ND}$ |
| Example 1 | 0.33 | 0.23 | 72 | 85 | 0.2 | 0.1 | 6.5 | 9.5 |
| Example 2 | 0.29 | 0.25 | 72 | 85 | 0.2 | 0 | 7.2 | 9.2 |
| Example 3 | 0.23 | 0.29 | 72 | 85 | 0.3 | 0 | 10.0 | 7.8 |
| Example 4 | 0.34 | 0.22 | 70 | 85 | 0.2 | 0.1 | 6.5 | 9.8 |
| Example 5 | 0.32 | 0.23 | 70 | 85 | 0.2 | 0.1 | 6.8 | 9.5 |
| Example 6 | 0.33 | 0.30 | 118 | 121 | 0 | 0 | — | — |
| Example 7 | 0.29 | 0.34 | 118 | 121 | 0 | 0 | — | — |

TABLE 4-continued

|  | Creep compliance (GPa$^{-1}$) | | Heat shrinkage starting temperature (° C.) | | Heat shrinkage at 80° C. (%) | | Peak intensity in laser Raman scattering (R) | |
| --- | --- | --- | --- | --- | --- | --- | --- | --- |
|  | MD | TD | MD | TD | MD | TD | $I_{MD}/I_{ND}$ | $I_{TD}/I_{ND}$ |
| Example 8 | 0.33 | 0.30 | 70 | 80 | 0.3 | 0.2 | 6.6 | 8.0 |
| Example 9 | 0.32 | 0.29 | 70 | 80 | 0.2 | 0.1 | 6.8 | 8.3 |
| Comparative Example 1 | 0.45 | 0.36 | 72 | 85 | 0.1 | 0 | 5.0 | 5.6 |
| Comparative Example 2 | 0.44 | 0.32 | 72 | 85 | 0.1 | 0 | 5.1 | 5.8 |
| Comparative Example 3 | 0.36 | 0.46 | 70 | 85 | 0.3 | 0.1 | 5.5 | 5.1 |
| Comparative Example 4 | 0.29 | 0.45 | 70 | 85 | 0.2 | 0.2 | 5.8 | 5.0 |
| Comparative Example 5 | 0.45 | 0.25 | 117 | 121 | 0 | 0 | — | — |

MD: machine direction
TD: transverse direction

Examples 2–7, Comparative Examples 1–5

In Examples 2–5, the same materials as used in Example 1 were used and film was produced under different stretching conditions. In Example 5, pellets of polyethylene terephthalate (intrinsic viscosity 0.86) produced by a known method were used to produce film by the same procedure as in Example 1. In Examples 6 and 7 and Comparative example 5, pellets of polyethylene terephthalate (intrinsic viscosity 0.65) produced by a known method were used to produce film using the same drying conditions, extruder, T-die, and stretching machine. The stretching conditions are shown in Table 1. Table 1 shows the film production conditions, and the breakage frequency of the film, while Table 2 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 3 shows the resultant film's Young's modulus, circumferential half-width of the diffraction line, crystal size, diagonal Young's modulus, propagating tear strength in the width direction, refractive index in the normal direction, planar orientation index, and density, while Table 4 gives its creep compliance, heat shrinkage starting temperature, heat shrinkage at 80° C., and peak intensity in laser Raman scattering (R).

If the properties of the film biaxially stretched in the machine direction and the transverse direction were in the required range for the present invention, the film was high in strength in both the machine direction and the transverse direction, strength in all directions within the film plane, deformation resistance under load, and dimensional stability, as well as stability during the film production process. In Comparative examples 1–5, however, molecular chains of polyester were not disentangled effectively in the transverse direction and the machine direction, and sufficient strength was not achieved, failing to produce a film that could meet the criteria of the present invention.

Examples 8–9

The same material as in Example 1 was used to produce substantially non-oriented, non-stretched cast film. Specifically, biaxially stretched film with a thickness of 10.1 μm was produced by the same procedure as in Example 1 except that the slit space of the die, which worked to shape the molten PET into a sheet, was controlled in the width direction so that the ratio (A/B) of the maximum thickness of the edge part of the non-stretched cast film (A) to its thickness at the center of width (B) was 1.7 in Example 8 and 6.5 in Example 9. Table 1 shows the film production conditions, and the breakage frequency of the film, while Table 2 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 3 shows the resultant film's Young's modulus, circumferential half-width of the diffraction line, crystal size, diagonal Young's modulus, propagating tear strength in the width direction, refractive index in the normal direction, planar orientation index, and density, while Table 4 gives its creep compliance, heat shrinkage starting temperature, heat shrinkage at 80° C., and peak intensity in laser Raman scattering (R).

In Example 8, the rigidity of the film end was insufficient during the stretching in the machine direction (MD stretching 1). As a result, the width became narrower (neck-down), and refractive index increased, leading to an increased crystallinity of the biaxially stretched film. In Example 9, a difference in film thickness took place, and the birefringence at the end of the biaxially stretched film was 0.018, leading to a decreased draw ratio in the subsequent stretching in the machine direction (MD stretching 2).

Examples 10–12, Comparative Examples 6–9

Two extruders, referred to as A and B, were used. Pellets of PET I (intrinsic viscosity 0.65, glass transition temperature 75° C. melting point 255° C., containing 0.16 wt % spherical silica particles with average diameter of 0.07 μm) were vacuum-dried at 180° C. for 3 hours, and fed to extruder A heated at 280° C., whereas pellets of PET II (intrinsic viscosity 0.65, glass transition temperature 75° C. melting point 255° C., containing 0.2 wt % spherical cross-linked polystyrene particles with average diameter of 0.3 μm and 0.01 wt % spherical cross-linked polystyrene particles with average diameter of 0.8 μm) were vacuum-dried at 180° C. for 3 hours, and fed to extruder B heated at 280° C. The two materials were then combined in the T-die (laminate ratio I/II=10/1) and put over a cast drum with a surface temperature of 25° C. using electrostatic force to ensure their close contact, so that the sheet would be cooled to solidify into a non-stretched laminate film. The laminate film was 1.571 in the refractive index in the machine direction, 1.570 in the refractive index in the transverse direction, and 0.8% in crystallinity. The ratio (A/B) of the maximum thickness of the edge part of the non-stretched film (A) to its thickness at the center of width (B) was 3.8. This non-stretched film was heated on heating rolls (surface material: silicone rubber) and stretched in the machine direction at the temperature and up to the draw ratio given in Table 5, followed by cooling (MD stretching 1). The film was held by clips at its both ends and introduced into a tenter, where it was stretched in two steps in the transverse direction at the temperature and the draw ratio given in Table 5 (TD stretching 1 and 2). The film was heated on heating metal rolls and stretched in the machine direction at the temperature and the draw ratio given in Table 5 (MD stretching 2). Subsequently, with its ends held by clips, the film was introduced into the tenter and stretched in two steps in the transverse direction at the temperature and the draw ratio given in Table 5 (TD stretching 3), followed by heat treatment at a temperature of 200° C., relaxation in the transverse direction in the 150° C. cooling zone at a relaxation rate of 3%, relaxation in the transverse direction in the 100° C. zone at a relaxation rate of 1.0%, gradual cooling to room temperature, and winding. The extrusion rate was controlled to adjust the film thickness to 6.7 μm. Table 5 shows the film production conditions, and Table 6 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 7 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 8 gives its creep compliance, heat shrinkage starting temperature, heat shrinkage at 80° C., and peak intensity in laser Raman scattering (R), as well as magnetic tape's travelling durability and preservability.

In Example 11, the total draw ratio for the MD stretching 1 process was achieved in two steps, and the total draw ratio for MD stretching 2 was achieved in two steps, which further increased the strength of the film. In Comparative example 6, molecular chains of PET were not disentangled sufficiently in the machine direction, making it impossible to produce a film that could meet the criteria of the present invention. In Comparative example 7, the film's orientation and crystallinity after MD stretching 1 and TD stretching 1 were not sufficiently high to meet the criteria of the invention, and film breakage took place in MD stretching 2 and TD stretching 3, resulting in a decreased draw ratio. In Comparative example 8, molecular chains of PET were disentangled only in the machine direction, making it impossible to produce a film that could meet the criteria of the present invention. In Comparative example 9, molecular chains of PET were not disentangled in the machine direction and the transverse direction, making it impossible to produce a film that could meet the criteria of the present invention.

TABLE 5

|  | MD stretching 1 | | TD stretching 1 | | TD stretching 2 | | MD stretching 2 | | | |
|  | | | | | | | 1st stretching | | 2nd stretching | |
|  | Temp. (° C.) | Ratio (times) | Temp. (° C.) | Ratio (times) | Temp. (° C.) | Ratio (times) | Temp. (° C.) | Ratio (times) | Temp. (° C.) | Ratio (times) |
| --- | --- | --- | --- | --- | --- | --- | --- | --- | --- | --- |
| Example 10 | 110 | 2.0 | 115 | 2.0 | 75 | 3.5 | 80 | 3.4 | 130 | 1.1 |
| Example 11 | 110 | 1.5/1.5 | 115 | 2.0 | 75 | 3.6 | 80 | 1.2/1.9 | 130 | 1.1 |
| Example 12 | 115 | 1.7 | 110 | 1.7 | 75 | 3.5 | 80 | 1.3/3.0 | 140 | 1.1 |
| Comparative Example 6 | 100 | 1.1 | 100 | 2.5 | 75 | 3.5 | 80 | 3.4 | 130 | 1.1 |
| Comparative Example 7 | 105 | 2.8 | 105 | 2.8 | 75 | 3.5 | 80 | 3.0 | 130 | 1.1 |
| Comparative Example 8 | 110 | 2.0 | 95 | 2.0 | 95 | 2.0 | 95 | 3.5 | 130 | 1.1 |
| Comparative Example 9 | 95 | 2.0 | 95 | 2.0 | 95 | 2.0 | 95 | 2.0 | 130 | 1.1 |
| Comparative Example 10 | 110 | 2.4 | 110 | 2.4 | 80 | 3.5 | 85 | 3.0 | 130 | 1.1 |
| Comparative Example 11 | 95 | 3.0 | 100 | 1.9 | 100 | 1.9 | 105 | 1.3 | 140 | 1.1 |
| Example 13 | 110 | 1.5/1.5 | 115 | 2.0 | 75 | 3.6 | 80 | 1.3/3.0 | 140 | 1.1 |
| Example 14 | 165 | 2.2 | 160 | 2.2 | 122 | 3.6 | 133 | 3.6 | 160 | 1.1 |
| Comparative Example 12 | 140 | 4.0 | 135 | 2.0 | 135 | 1.9 | 160 | 1.2 | — | — |

|  | TD stretching 3 | | | | Total draw ratio (times) |
|  | 1st stretching | | 2nd stretching | | |
|  | Temp. (° C.) | Ratio (times) | Temp. (° C.) | Ratio (times) | |
| --- | --- | --- | --- | --- | --- |
| Example 10 | 170 | 1.3 | 190 | 1.1 | 75 |
| Example 11 | 170 | 1.3 | 190 | 1.1 | 89 |
| Example 12 | 180 | 1.4 | 200 | 1.1 | 67 |
| Comparative Example 6 | 170 | 1.2 | 190 | 1.1 | 48 |
| Comparative Example 7 | 170 | 1.1 | 190 | 1.0 | 100 |
| Comparative | 170 | 1.1 | 190 | 1.1 | 37 |

TABLE 5-continued

| | | | | | |
|---|---|---|---|---|---|
| Example 8 | | | | | |
| Comparative Example 9 | 150 | 1.1 | 180 | 1.1 | 21 |
| Comparative Example 10 | 180 | 1.2 | 190 | 1.0 | 80 |
| Comparative Example 11 | 190 | 1.4 | — | — | 22 |
| Example 13 | 180 | 1.4 | 200 | 1.1 | 107 |
| Example 14 | 170 | 1.3 | 190 | 1.1 | 99 |
| Comparative Example 12 | 190 | 1.3 | — | — | 24 |

MD: machine direction
TD: transverse direction

TABLE 6

| | Properties of non-stretched film | | | Properties of film after MS Stretching 1 and TD stretching 1 | | | | |
|---|---|---|---|---|---|---|---|---|
| | End thickness ratio (A/B) | Refractive index | | Crystallinity (%) | Refractive index | | Birefringence | Crystallinity (%) | Breakage frequency |
| | | MD | TD | | MD | TD | | | |
| Example 10 | 3.8 | 1.571 | 1.570 | 0.8 | 1.575 | 1.577 | 0.002 | 0.9 | ⊚ |
| Example 11 | 3.8 | 1.571 | 1.570 | 0.8 | 1.576 | 1.577 | 0.001 | 1.0 | ○ |
| Example 12 | 3.8 | 1.571 | 1.570 | 0.8 | 1.574 | 1.575 | 0.001 | 0.9 | ○ |
| Comparative Example 6 | 3.8 | 1.571 | 1.570 | 0.8 | 1.572 | 1.598 | 0.026 | 6.5 | X |
| Comparative Example 7 | 3.8 | 1.571 | 1.570 | 0.8 | 1.590 | 1.593 | 0.003 | 7.0 | X |
| Comparative Example 8 | 3.8 | 1.571 | 1.570 | 0.8 | 1.575 | 1.596 | 0.021 | 6.3 | Δ |
| Comparative Example 9 | 3.8 | 1.57i | 1.570 | 0.8 | 1.595 | 1.597 | 0.002 | 8.0 | Δ |
| Comparative Example 10 | 3.8 | 1.574 | 1.572 | 1.8 | 1.583 | 1.588 | 0.005 | 6.2 | X |
| Comparative Example 11 | 3.8 | 1.571 | 1.570 | 0.8 | 1.632 | 1.597 | 0.035 | 17.2 | ○ |
| Example 13 | 3.4 | 1.571 | 1.570 | 0.6 | 1.576 | 1.576 | 0 | 0.9 | ○ |
| Example 14 | 3.5 | 1.649 | 1.648 | 0.7 | 1.656 | 1.658 | 0.002 | 0.9 | ○ |
| Comparative Example 12 | 3.5 | 1.649 | 1.648 | 0.7 | 1.730 | 1.692 | 0.038 | 14.8 | Δ |

MD: machine direction
TD: transverse direction

TABLE 7

| | Young's modulus (GPa) | | Circumferential half-width of diffraction line (°) | Crystal size (Å) | Diagonal Young's modulus (GPa) | | Propagating tear strength in width direction (g/5 μm) | Refractive index in normal direction | Planar orientation index | Density (g/cm³) | Surface roughness (Ra) (nm) | |
|---|---|---|---|---|---|---|---|---|---|---|---|---|
| | MD | TD | | | 45° | 135° | | | | | Layer I surface | Layer II surface |
| Example 10 | 6.5 | 8.5 | 80 | 61 | 7.2 | 7.2 | 1.2 | 1.482 | 0.182 | 1.391 | 4.0 | 10.5 |
| Example 11 | 7.2 | 9.2 | 85 | 65 | 7.8 | 7.8 | 1.1 | 1.476 | 0.192 | 1.389 | 3.8 | 9.8 |
| Example 12 | 6.8 | 8.6 | 75 | 55 | 7.2 | 7.3 | 1.0 | 1.478 | 0.189 | 1.390 | 4.1 | 10.3 |
| Comparative Example 6 | 4.8 | 9.2 | 45 | 43 | 5.6 | 5.6 | 0.6 | 1.488 | 0.173 | 1.391 | 4.2 | 10.6 |
| Comparative Example 7 | 5.4 | 5.1 | 48 | 42 | 5.2 | 5.3 | 0.7 | 1.486 | 0.171 | 1.390 | 4.4 | 10.6 |
| Comparative Example 8 | 5.8 | 5.5 | 42 | 42 | 5.8 | 5.9 | 0.7 | 1.486 | 0.170 | 1.390 | 4.1 | 10.5 |
| Comparative Example 9 | 5.3 | 5.4 | 45 | 40 | 5.5 | 5.4 | 0.7 | 1.492 | 0.168 | 1.392 | 4.2 | 10.6 |

TABLE 7-continued

| | Young's modulus (GPa) | | Circumferential half-width of diffraction line (°) | Crystal size (Å) | Diagonal Young's modulus (GPa) | | Propagating tear strength in width direction (g/5 μm) | Refractive index in normal direction | Planar orientation index | Density (g/cm³) | Surface roughness (Ra) (nm) | |
|---|---|---|---|---|---|---|---|---|---|---|---|---|
| | MD | TD | | | 45° | 135° | | | | | Layer I surface | Layer II surface |
| Comparative Example 10 | 5.2 | 5.8 | 52 | 43 | 5.8 | 5.9 | 0.7 | 1.489 | 0.170 | 1.390 | 4.5 | 10.7 |
| Comparative Example 11 | 6.5 | 5.5 | 42 | 42 | 6.0 | 6.1 | 0.7 | 1.488 | 0.173 | 1.392 | 3.8 | 10.3 |
| Example 13 | 6.6 | 8.5 | 80 | 55 | 7.3 | 7.3 | 1.3 | 1.478 | 0.187 | 1.388 | 3.9 | 10.1 |
| Example 14 | 6.7 | 8.5 | 70 | 51 | 7.4 | 7.4 | 0.7 | 1.491 | — | 1.348 | 4.2 | 10.6 |
| Comparative Example 12 | 5.8 | 7.6 | 45 | 40 | 6.4 | 6.3 | 0.5 | 1.496 | — | 1.349 | 4.3 | 10.7 |

MD: machine direction
TD: transverse direction

TABLE 8

| | Creep compliance (GPa$^{-1}$) | | Heat shrinkage starting temperature (° C.) | | Heat shrinkage at 80° C. (%) | | Peak intensity in laser Raman scattering (R) | | Travelling durability | Recording tape preservability |
|---|---|---|---|---|---|---|---|---|---|---|
| | MD | TD | MD | TD | MD | TD | $I_{MD}/I_{ND}$ | $I_{TD}/I_{ND}$ | | |
| Example 10 | 0.29 | 0.25 | 70 | 85 | 0.2 | 0 | 7.0 | 9.2 | ○ | ○ |
| Example 11 | 0.20 | 0.17 | 70 | 85 | 0.2 | 0 | 8.2 | 9.5 | ○ | ○ |
| Example 12 | 0.26 | 0.22 | 68 | 85 | 0.3 | 0.1 | 7.5 | 9.0 | ○ | ○ |
| Comparative Example 6 | 0.45 | 0.20 | 70 | 76 | 0.2 | 0.2 | 5.0 | 6.5 | X | X |
| Comparative Example 7 | 0.40 | 0.42 | 70 | 85 | 0.2 | 0.1 | 5.4 | 5.6 | X | X |
| Comparative Example 8 | 0.37 | 0.39 | 70 | 85 | 0.2 | −0.1 | 5.5 | 5.0 | X | X |
| Comparative Example 9 | 0.42 | 0.41 | 70 | 85 | 0.1 | −0.1 | 5.3 | 5.2 | X | X |
| Comparative Example 10 | 0.42 | 0.38 | 70 | 88 | 0.2 | 0 | 6.5 | 7.0 | X | X |
| Comparative Example 11 | 0.38 | 0.39 | 70 | 85 | 0.2 | −0.1 | 5.8 | 5.5 | Δ | Δ |
| Example 13 | 0.25 | 0.22 | 67 | 83 | 0.3 | 0.1 | 7.5 | 8.5 | ○ | ○ |
| Example 14 | 0.32 | 0.29 | 115 | 121 | 0 | 0 | — | — | ○ | ○ |
| Comparative Example 12 | 0.38 | 0.36 | 120 | 122 | 0 | 0 | — | — | Tape severed | Δ |

MD: machine direction
TD: transverse direction

Comparative Example 10

From the same PET material as in Example 10, a non-stretched laminate film was produced by the same procedure as in Example 10 except that a sheet was produced at an increased extrusion rate of the extruder and that the rotation rate of the cast drum, with its surface temperature adjusted to 60° C., was increased to increase the rate of winding the sheet. The non-stretched laminate film was 1.574 in the refractive index in the machine direction, 1.572 in the refractive index in the transverse direction, and 1.8% in crystallinity. This laminate film was stretched under the sequential biaxial stretching conditions used in Example 11 shown in Table 5, but frequent film breakage took place during the MD stretching 2 process. So, stretching was carried out under the sequential biaxial conditions given in Table 5 to produce a stretched film with a thickness of 6.7 μm. Table 5 shows the film production conditions, and Table 6 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 7 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 8 gives its creep compliance, heat shrinkage starting temperature, heat shrinkage at 80° C., and peak intensity in laser Raman scattering (R), as well as magnetic tape's travelling durability and preservability.

In Comparative Example 10, the crystallinity of the non-stretched film was so high that the crystallinity of the biaxially stretched film after MD stretching 1 and TD stretching 1 was not in the desired range for the present invention, making it impossible to produce a film that could meet the criteria of the present invention.

Comparative Example 11

From the same PET material as in Example 10, a non-stretched laminate film was produced by the same procedure as in Example 10. This non-stretched film was introduced to the heating metal rolls for heating at a temperature of 95° C. and stretching at a draw ratio of 3 times in the machine direction, and the longitudinally stretched film was introduced to the tenter, with its ends held by clips, for heating at a temperature of 100° C. and stretching at a draw ratio of 3.61 times in the transverse direction. This biaxially stretched film was introduced to the heating metal rolls, and further stretched at draw ratios of 1.3 and 1.1 times in the machine direction at the two temperatures of 105° C. and 140° C. This stretched film was introduced to the tenter, with its ends held by clips, heated to 190° C., and stretched in the transverse direction to a draw ratio of 1.4 times, followed by heat treatment at a temperature of 200° C., relaxation in the transverse direction in the 150° C. cooling zone at a relaxation rate of 3%, relaxation in the transverse direction in the 100° C. zone at a relaxation rate of 1.0%, gradual cooling to room temperature, and winding. The extrusion rate was controlled to adjust the film thickness to 6.7 μm. Table 5 shows the film production conditions, and Table 6 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 7 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 8 gives its creep compliance, heat shrinkage starting temperature, heat shrinkage at 80° C., and peak intensity in laser Raman scattering (R), as well as magnetic tape's travelling durability and preservability.

In this comparative example, molecular chains of PET were not untangled in either the machine direction or the transverse direction. In this case, despite the re-stretching to increase the strength, the Young's modulus was low and deformation resistance under load was not high.

Example 13

This example uses high-molecular weight polyethylene terephthalates.

Two extruders, referred to as A and B, were used. Pellets of PET I (intrinsic viscosity 0.75, glass transition temperature 76° C., melting point 256° C., containing 0.16 wt % spherical silica particles with average diameter of 0.07 μm) were vacuum-dried at 180° C. for 3 hours, and fed to extruder A heated at 280° C., whereas pellets of PET II (intrinsic viscosity 0.75, glass transition temperature 76° C., melting point 256° C., containing 0.2 wt % spherical cross-linked polystyrene particles with average diameter of 0.3 μm and 0.01 wt % spherical cross-linked polystyrene particles with average diameter of 0.8 μm) were vacuum-dried at 180° C. for 3 hours, and fed to extruder B heated at 280° C. The two materials were then combined in the T-die (laminate ratio I/II=10/1) and put over a cast drum with a surface temperature of 25° C. using electrostatic force to ensure their close contact, so that the sheet would be cooled to solidify into a non-stretched laminate film (1.571 in the refractive index in the machine direction, 1.570 in the refractive index in the transverse direction, and 0.6% in crystallinity). This non-stretched film was heated on heating rolls (surface material: silicone rubber) and stretched in the machine direction at the temperature and up to the draw ratio given in Table 5, followed by cooling (MD stretching 1). The film was held by grips at its both ends and introduced into a tenter, where it was stretched in the transverse direction at the temperature and up to the draw ratio given in Table 5 and subsequently stretched in the transverse direction at the temperature and up to the draw ratio given in Table 5 (TD stretching 1 and 2). The film was heated on heating metal rolls and stretched in the machine direction at the two temperatures given in Table 5 and up to the draw ratio given in Table 5 (MD stretching 2). Except that the film, with its ends held by clips, was introduced into the tenter and stretched in the transverse direction at the two temperatures given in Table 5 and up to the draw ratio given in Table 5 (TD stretching 3), the same procedure as in Example 10 was carried out to produce a biaxially stretched film with a thickness of 6.7 μm. Table 5 shows the film production conditions, and Table 6 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 7 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 8 gives its creep compliance, heat shrinkage starting temperature, heat shrinkage at 80° C., and peak intensity in laser Raman scattering (R), as well as magnetic tape's travelling durability and preservability.

The use of PET material with a higher molecular weight made it possible to produce a film that was higher in strength and tear resistance than the film in Example 11.

Example 14

This example uses PEN (polyethylene naphthalate) as polyester material.

Two extruders, referred to as A and B, were used. Pellets of polyethylene naphthalate (hereinafter, referred to as PEN) I (intrinsic viscosity 0.65, glass transition temperature 124° C. melting point 265° C., containing 0.16 wt % spherical silica particles with average diameter of 0.07 μm) were vacuum-dried at 180° C. for 3 hours, and fed to extruder A heated at 290° C., whereas pellets of PEN II (intrinsic viscosity 0.65, glass transition temperature 124° C., melting point 265° C., containing 0.2 wt % spherical cross-linked polystyrene particles with average diameter of 0.3 μm and 0.01 wt % spherical cross-linked polystyrene particles with average diameter of 0.8 μm) were vacuum-dried at 180° C. for 3 hours, and fed to extruder B heated at 290° C. The two materials were then combined in the T-die (laminate ratio I/II=10/1) and put over a cast drum with a surface temperature of 25° C. using electrostatic force to ensure their close contact, so that the sheet would be cooled to solidify into a non-stretched laminate film. The laminate film was 1.649 in the refractive index in the machine direction, 1.648 in the refractive index in the transverse direction, and 0.7% in crystallinity. This non-stretched film was heated on heating rolls (surface material: silicone rubber) and stretched in the machine direction at the temperature and up to the draw ratio given in Table 5, followed by cooling (MD stretching 1). The film was held by clips at its both ends and introduced into a tenter, where it was stretched in two steps in the transverse direction at the temperature and up to the draw ratio given in Table 5 (TD stretching 1 and 2). The film was heated on heating metal rolls and stretched in the machine direction at the temperature and up to the draw ratio given in Table 5 (MD stretching 2). Subsequently, with its ends held by clips, the film was introduced into the tenter and stretched in two steps in the transverse direction at the temperature and up to the draw ratio given in Table 5 (TD stretching 3), followed by heat treatment at a temperature of 210° C. relaxation in the transverse direction in the 170° C. cooling zone at a relaxation rate of 3%, relaxation in the transverse direction in the 130° C. zone at a relaxation rate of 0.5%, gradual cooling to room temperature, and winding. The extrusion rate was controlled to adjust the film thickness to 6.7 μm. Table 5 shows the film production conditions, and Table 6 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 7 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 8 gives its creep compliance, heat shrinkage starting temperature, heat shrinkage at 80° C., and peak intensity in laser Raman scattering (R), as well as magnetic tape's travelling durability and preservability.

A film of the present invention which was high in strength and tear resistance as well as stability during film production was also obtained when PEN was used as polyester material Comparative Example 12

A non-stretched laminate film was produced by the same procedure as in Example 14. This non-stretched film was introduced to the heating metal rolls for heating at a temperature of 140° C. and stretched at a draw ratio of 4 times in the machine direction, and the longitudinally stretched film was introduced to the tenter, with its ends held by clips, for heating at a temperature of 135° C. and stretched at a draw ratio of 3.8 times in the transverse direction. This biaxially stretched film was introduced to the heating metal rolls, and further stretched at a draw ratio of 1.2 times in the machine direction at a temperatures of 160° C. This stretched film was introduced to the tenter, with its ends held by clips, heated to 190° C., and stretched in the transverse direction at a draw ratio of 1.3 times, followed by heat treatment at a temperature of 210° C., relaxation in the transverse direction in the 170° C. cooling zone at a relaxation rate of 3%, relaxation in the transverse direction in the 130° C. zone at a relaxation rate of 0.5%, gradual cooling to room temperature, and winding. The extrusion rate was controlled to adjust the film thickness to 6.7 μm. Table 5 shows the film production conditions, and Table 6 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 7 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 8 gives its creep compliance, heat shrinkage starting temperature, heat shrinkage at 80° C., and peak intensity in laser Raman scattering (R), as well as magnetic tape's travelling durability and preservability.

When PEN is used as material as well, it was difficult to stretch the film up to a high draw ratio and the resulting film was not high in stability during film production and tear resistance unless molecular chains of PEN were not untangled.

Examples 15 and 16, Comparative Examples 13 and 14

Pellets of polyethylene terephthalate (intrinsic viscosity 0.65, glass transition temperature 75° C., melting point 255° C. containing 0.1 wt % spherical cross-linked polystyrene of average diameter 0.3 μm) produced by a known method were vacuum-dried at 180° C. for 3 hours, supplied to an extruder heated at 280° C., and melt-extruded through the T-die into a sheet. The sheet was put over a cooling drum with a surface temperature of 25° C. using electrostatic force to ensure their close contact, so that the sheet would be cooled to solidify into a non-stretched cast film. This non-stretched film was held by clips at its ends, introduced to a tenter for simultaneous biaxial stretching that had a drive unit with a linear motor to move the clips, pre-heated at a temperature of 110° C., subjected to the first-step simultaneous biaxial stretching to a draw ratio given in Table 9, subjected to the second-step simultaneous biaxial stretching to a draw ratio given in Table 9 at a temperature of 80° C., heat-treated at a temperature of 210° C., relaxed in the 120° C. cooling zone at a relaxation rate of 1.5% in the machine direction and a relaxation rate of 2% in the transverse direction, cooled gradually to room temperature, and wound. The extrusion rate was controlled to adjust the film thickness to 9 μm. The temperature of tenter clips was 100° C. In the comparative examples, the same procedure as in Example 15 was carried out except that the stretch temperature and draw ratio were as in Table 9. When the film end part which was used to hold the film by clips was observed, evidence of film stretching was found in Examples 15 and 16, whereas non-stretched portions were found in the film end, and film was found broken from the film end, in Comparative example 13 and 14. Table 9 shows the film production conditions and breakage frequency, and Table 10 gives the ratio (A/B) of the maximum thickness of the edge-part of the non-stretched film (A) to its thickness at the center of width (B), its refractive index, and its crystallinity, as well as the refractive index, birefringence, and crystallinity during the film production process. Table 11 shows the resultant film's Young's modulus, circumferential half-width of the diffraction line, crystal size, diagonal Young's modulus, propagating tear strength in the width direction, refractive index in the normal direction, planar orientation index, and density, while Table 12 gives its creep compliance, heat shrinkage starting temperature, heat shrinkage at 80° C., and peak intensity in laser Raman scattering (R).

In the case of simultaneous biaxial stretching as well, failing to disentangle the PET molecular chains prior to orientation by biaxial stretching, as in Comparative examples 13 and 14, results in films with poor stretching properties, particularly at the film end used for clipping, making it difficult to produce films of the present invention.

TABLE 9

| | 1st simultaneous biaxial stretching | | | 2nd simultaneous biaxial stretching | | | Total draw ratio (times) | Breakage frequency |
|---|---|---|---|---|---|---|---|---|
| | Temp. (° C.) | Draw ratio (times) MD | TD | Temp. (° C.) | Draw ratio (times) MD | TD | | |
| Example 15 | 110 | 2.0 | 2.0 | 80 | 3.5 | 4.0 | 56 | ○ |
| Example 16 | 110 | 2.0 | 2.0 | 80 | 4.0 | 4.0 | 64 | ○ |
| Example 17 | 110 | 2.0 | 2.0 | 80 | 3.5 | 4.0 | 56 | Δ |
| Comparative Example 13 | 80 | 1.8 | 1.8 | 80 | 1.8 | 1.8 | 10 | Δ |
| Comparative Example 14 | 90 | 2.0 | 2.0 | 90 | 2.0 | 2.0 | 16 | Δ |

MD: machine direction
TD: transverae direction

TABLE 10

| | Properties of non-stretched film | | | | Properties of film after MD stretching 1 and TD stretching 1 | | |
|---|---|---|---|---|---|---|---|
| | End thickness ratio (A/B) | Refractive index MD | TD | Crystallinity (%) | Refractive index | Birefringence | Crystallinity (%) |
| Example 15 | 3.2 | 1.571 | 1.570 | 0.5 | 1.576 / 1.575 | 0.001 | 0.8 |
| Example 16 | 3.2 | 1.571 | 1.570 | 0.5 | 1.576 / 1.575 | 0.001 | 0.8 |
| Example 17 | 3.2 | 1.571 | 1.570 | 0.5 | 1.578 / 1.575 | 0.003 | 0.9 |
| Comparative Example 13 | 3.2 | 1.571 | 1.570 | 0.5 | 1.590 / 1.590 | 0 | 9.0 |
| Comparative Example 14 | 3.2 | 1.571 | 1.570 | 0.5 | 1.585 / 1.585 | 0 | 7.5 |

MD: machine direction
TD: transverse direction

TABLE 11

| | Young's modulus (GPa) | | Circumferential of diffraction line (°) | Crystal size (Å) | Diagonal Young's modulus (GPa) | | Propagating tear strength in width direction (g/5 μm) | Refractive index in normal direction | Planar orientation index | Density (g/cm³) |
|---|---|---|---|---|---|---|---|---|---|---|
| | MD | TD | | | 45° | 135° | | | | |
| Example 15 | 6.5 | 7.5 | 81 | 60 | 6.9 | 7.0 | 1.2 | 1.482 | 0.180 | 1.394 |
| Example 16 | 7.0 | 7.0 | 84 | 65 | 6.8 | 6.9 | 1.1 | 1.479 | 0.182 | 1.393 |
| Example 17 | 6.2 | 7.0 | 75 | 55 | 6.5 | 6.8 | 0.8 | 1.485 | 0.177 | 1.395 |
| Comparative Example 13 | 4.3 | 4.3 | 45 | 42 | 4.3 | 4.4 | 1.4 | 1.492 | 0.162 | 1.394 |
| Comparative Example 14 | 4.6 | 4.5 | 50 | 42 | 4.5 | 4.4 | 1.5 | 1.490 | 0.165 | 1.394 |

MD: machine direction
TD: transverse direction

TABLE 12

| | Creep compliance (GPa$^{-1}$) | | Heat shrinkage starting temperature (° C.) | | Heat shrinkage at 80° C. (%) | | Peak intensity in laser Raman scattering (R) | |
|---|---|---|---|---|---|---|---|---|
| | MD | TD | MD | TD | MD | TD | $I_{MD}/I_{ND}$ | $I_{TD}/I_{ND}$ |
| Example 15 | 0.28 | 0.19 | 72 | 85 | 0.1 | 0 | 7.0 | 8.0 |
| Example 16 | 0.22 | 0.21 | 72 | 85 | 0.2 | 0 | 8.0 | 8.0 |
| Example 17 | 0.32 | 0.34 | 72 | 85 | 0.2 | 0.1 | 6.8 | 7.9 |
| Comparative Example 13 | 0.45 | 0.45 | 75 | 85 | 0.1 | 0 | 4.2 | 4.2 |

TABLE 12-continued

|  | Creep compliance (GPa$^{-1}$) | | Heat shrinkage starting temperature (° C.) | | Heat shrinkage at 80° C. (%) | | Peak intensity in laser Raman scattering (R) | |
| --- | --- | --- | --- | --- | --- | --- | --- | --- |
|  | MD | TD | MD | TD | MD | TD | $I_{MD}/I_{ND}$ | $I_{TD}/I_{ND}$ |
| Comparative Example 14 | 0.43 | 0.42 | 75 | 85 | 0.1 | 0 | 4.5 | 4.6 |

MD: machine direction
TD: transverse direction

Example 17

A film with a thickness of 9 μm was produced by the same procedures as in Example 15 except that the temperature of the clips of the tenter for simultaneous stretching was 70° C. Non-stretched portions were found in the film end part used for clipping, and the film was found broken from the film end part, indicating that the film end part used for gripping was relatively poor in stretching properties as compared to the film in Example 15. Table 9 shows the film production conditions and breakage frequency, and Table 10 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 11 shows the resultant film's Young's modulus, circumferential half-width of the diffraction line, crystal size, diagonal Young's modulus, propagating tear strength in the width direction, refractive index in the normal direction, planar orientation index, and density, while Table 12 gives its creep compliance, heat shrinkage starting temperature, heat shrinkage at 80° C., and peak intensity in laser Raman scattering (R).

Examples 18–19, Comparative Examples 15–16

Pellets of polyethylene terephthalate (intrinsic viscosity 0.65, glass transition temperature 75° C., melting point 255° C., containing 0.1 wt % spherical cross-linked polystyrene of average diameter 0.3 μm) produced by a known method were vacuum-dried at 180° C. for 3 hours, supplied to an extruder heated at 280° C., and melt-extruded through the T-die into a sheet. The sheet was put over a cooling drum with a surface temperature of 25° C. using electrostatic force to ensure their close contact, so that the sheet would be cooled to solidify into a non-stretched cast film. This non-stretched film was held by clips at its ends, introduced to a tenter for simultaneous biaxial stretching that had a drive unit with a linear motor to move the clips, pre-heated at a temperature of 110° C., subjected to the first-step simultaneous biaxial stretching to a draw ratio given in Table 13, and subjected to the second-step simultaneous biaxial stretching to a draw ratio given in Table 13 at a temperature of 80° C. Subsequently, the third-step simultaneous biaxial stretching was carried out at a temperature of 160° C. to a stretching ratio given in Table 13, and then the film was heat-treated at a temperature of 210° C., relaxed in the 120° C. cooling zone at a relaxation rate of 2% in the machine direction and a relaxation rate of 3% in the transverse direction, cooled gradually to room temperature, and wound. The extrusion rate was controlled to adjust the film thickness to 9 μm. The clip temperature was 105° C. In the comparative examples, the same procedure as in Example 18 was carried out except that the stretch temperature and draw ratio were as in Table 13. When the film end part which was used to hold the film by clips was observed, the part used for clipping was found stretched up to a draw ratio close to that in the machine direction in the case of Examples 18 and 19, while in Comparative example 15, some portions of the film end part used for clipping were low in draw ratio, with breakage from the film end found. In Comparative example 16, breakage from the film end was found, and it was impossible to stretch the film. Table 13 shows the film production conditions and breakage frequency, and Table 14 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 15 shows the resultant film's Young's modulus, circumferential half-width of the diffraction line, crystal size, diagonal Young's modulus, propagating tear strength in the width direction, refractive index in the normal direction, planar orientation index, and density, while Table 16 gives its creep compliance, heat shrinkage starting temperature, heat shrinkage at 80° C., and peak intensity in laser Raman scattering (R).

In Examples 18 and 19, simultaneous biaxial stretching in multiple steps enhanced the stretching properties of the film and the film's strength was still higher compared to Example 16. In Comparative examples, molecular chains of PET were not disentangled, which made it impossible to stretch the film up to a high draw ratio, resulting in low film strength and low stability during film production.

TABLE 13

|  | 1st simultaneous biaxial stretching | | | 2nd simultaneous biaxial stretching | | | 3rd simultaneous biaxial stretching | | | Total draw ratio (times) | Breakage frequency |
| --- | --- | --- | --- | --- | --- | --- | --- | --- | --- | --- | --- |
|  | | Draw ratio (times) | | | Draw ratio (times) | | | Draw ratio (times) | | | |
|  | Temp. (° C.) | MD | TD | Temp. (° C.) | MD | TD | Temp (° C.) | MD | TD | | |
| Example 18 | 110 | 2.0 | 2.0 | 80 | 3.0 | 3.0 | 160 | 1.3 | 1.5 | 70 | ⊙ |
| Example 19 | 110 | 2.0 | 2.0 | 80 | 3.0 | 3.0 | 160 | 1.5 | 1.5 | 81 | ○ |
| Comparative Example 15 | 90 | 2.0 | 2.0 | 90 | 1.5 | 1.5 | 160 | 1.3 | 1.3 | 15 | Δ |

TABLE 13-continued

| | 1st simultaneous biaxial stretching | | | 2nd simultaneous biaxial stretching | | | 3rd simultaneous biaxial stretching | | | Total draw ratio (times) | Breakage frequency |
|---|---|---|---|---|---|---|---|---|---|---|---|
| | Temp. (° C.) | Draw ratio (times) MD | TD | Temp. (° C.) | Draw ratio (times) MD | TD | Temp (° C.) | Draw ratio (times) MD | TD | | |
| Comparative Example 16 | 90 | 2.0 | 2.0 | 90 | 1.5 | 1.5 | 160 | 1.5 | 1.5 | 20 | X |

MD: machine direction
TD: transverae direction

TABLE 14

| | Properties of non-stretched film | | | | Properties of film after MD stretching 1 and TD stretching 1 | | | |
|---|---|---|---|---|---|---|---|---|
| | End thickness ratio (A/B) | Refractive index MD | Refractive index TD | Crystallinity (%) | Refractive index MD | Refractive index TD | Birefringence | Crystallinity (%) |
| Example 18 | 3.2 | 1.571 | 1.570 | 0.5 | 1.576 | 1.575 | 0.001 | 0.8 |
| Example 19 | 3.2 | 1.571 | 1.570 | 0.5 | 1.576 | 1.575 | 0.001 | 0.8 |
| Comparative Example 15 | 3.2 | 1.571 | 1.570 | 0.5 | 1.585 | 1.585 | 0 | 7.5 |
| Comparative Example 16 | 3.2 | 1.571 | 1.570 | 0.5 | 1.585 | 1.585 | 0 | 7.5 |

MD: machine direction
TD: transverse direction

TABLE 15

| | Young's modulus (GPa) MD | Young's modulus (GPa) TD | Circumferential half-width of diffraction line (°) | Crystal size (Å) | Diagonal Young's modulus (GPa) 45° | Diagonal Young's modulus (GPa) 135° | Propagating tear strength in width direction (g/5 μm) | Refractive index in normal direction | Planar orientation index | Density (g/cm³) |
|---|---|---|---|---|---|---|---|---|---|---|
| Example 18 | 7.0 | 8.5 | 83 | 63 | 7.6 | 7.7 | 0.9 | 1.480 | 0.185 | 1.394 |
| Example 19 | 7.5 | 9.0 | 80 | 65 | 7.3 | 8.0 | 0.8 | 1.476 | 0.187 | 1.393 |
| Comparative Example 15 | 5.1 | 5.0 | 48 | 40 | 5.2 | 5.1 | 0.7 | 1.488 | 0.172 | 1.395 |
| Comparative Example 16 | — | — | — | — | — | — | — | — | — | — |

MD: machine direction
TD: transverse direction

TABLE 16

| | Creep compliance (GPa⁻¹) MD | Creep compliance (GPa⁻¹) TD | Heat shrinkage starting temperature (° C.) MD | Heat shrinkage starting temperature (° C.) TD | Heat shrinkage at 80° C. (%) MD | Heat shrinkage at 80° C. (%) TD | Peak intensoty in laser Raman scattering (R) $I_{MD}/I_{ND}$ | Peak intensoty in laser Raman scattering (R) $I_{TD}/I_{ND}$ |
|---|---|---|---|---|---|---|---|---|
| Example 18 | 0.21 | 0.18 | 72 | 85 | 0.2 | 0 | 9.2 | 10.3 |
| Example 19 | 0.20 | 0.16 | 72 | 85 | 0.2 | 0.1 | 9.5 | 11.0 |
| Comparative Example 15 | 0.42 | 0.41 | 75 | 85 | 0.1 | 0.1 | 5.3 | 5.4 |
| Comparative Example 16 | — | — | — | — | — | — | — | — |

MD. machine direction
TD: transverse direction

Example 20

Two extruders, referred to as A and B, were used. A film simultaneously stretched biaxially was produced by the same procedure as in Example 19 except that pellets of polyethylene terephthalate I (intrinsic viscosity 0.65, glass transition temperature 75° C., melting point 255° C., containing 0.2 wt % spherical cross-linked polystyrene particles with average diameter of 0.2 μm) were vacuum-dried at 180° C. for 3 hours, and fed to extruder A heated at 280° C., whereas pellets of polyethylene terephthalate II (intrinsic viscosity 0.65, glass transition temperature 75° C., melting point 255° C., containing 0.1 wt % spherical cross-linked polystyrene particles with average diameter of 0.3 μm and 0.025 wt % spherical cross-linked polystyrene particles with average diameter of 0.45 μm) were vacuum-dried at 180° C. for 3 hours, and fed to extruder B heated at 280° C., followed by a procedure in which the two materials were combined in the T-die (laminate ratio I/II=10/1) and put over a cast drum with a surface temperature of 30° C. using electrostatic force to ensure their close contact, so that the sheet would be cooled to solidify into a non-stretched laminate film with a thickness of 5.5 μm. Table 17 shows the film production conditions and breakage frequency, and Table 18 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 19 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 20 gives its creep compliance, heat shrinkage starting temperature, heat shrinkage at 80° C., peak intensity in laser Raman scattering (R), and surface damage during high-speed travelling, as well as magnetic tape's electromagnetic conversion property. The film of the present invention was found to be a very suitable material for magnetic recording media.

TABLE 17

| | 1st simultaneous biaxial stretching | | | 2nd simultaneous biaxial stretching | | | 3rd simultaneous biaxial stretching | | | Total draw ratio (times) | Breakage frequency |
|---|---|---|---|---|---|---|---|---|---|---|---|
| | Temp. (° C.) | Draw ratio (times) MD | TD | Temp. (° C.) | Draw ratio (times) MD | TD | Temp. (° C.) | Draw ratio (times) MD | TD | | |
| Example 20 | 110 | 2.0 | 2.0 | 80 | 3.0 | 3.0 | 160 | 1.5 | 1.5 | 81 | ○ |

MD: machine direction
TD: transverse direction

TABLE 18

| | Properties of non-stretched film | | | | Properties of film after MD stretching 1 and TD stretching 1 | | | |
|---|---|---|---|---|---|---|---|---|
| | End thickness ratio (A/B) | Refractive index MD | TD | Crystallinity (%) | Refractive index MD | TD | Birefringence | Crystallinity (%) |
| Example 20 | 3.5 | 1.572 | 1.570 | 0.5 | 1.576 | 1.575 | 0.001 | 0.8 |

MD: machine direction
TD: transverse direction

TABLE 19

| | Young's modulus (GPa) | | Circumferential half-width of diffraction line (°) | Crystal size (Å) | Diagonal Young's modulus (GPa) | | Propagating tear strength in width direction (g/5 μm) | Refractive index in normal direction | Planar orientation index | Density (g/cm³) | Surface roughness (Ra) (nm) | |
|---|---|---|---|---|---|---|---|---|---|---|---|---|
| | MD | TD | | | 45° | 135° | | | | | Layer I surface | Layer II surface |
| Example 20 | 7.5 | 9.0 | 80 | 65 | 7.9 | 8.0 | 0.8 | 1.476 | 0.187 | 1.390 | 8 | 10 |

MD: machine direction
TD: transverse direction

TABLE 20

| | Creep compliance (GPa⁻¹) | | Heat shrinkage starting temperature (° C.) | | Heat shrinkage at 80° C. (%) | | Peak intensity in laser Raman scattering (R) | | surface damage during high speed travelling | Electromagnetic conversion property (C/N) |
|---|---|---|---|---|---|---|---|---|---|---|
| | MD | TD | MD | TD | MD | TD | $I_{MD}/I_{ND}$ | $I_{TD}/I_{ND}$ | | |
| Example 20 | 0.20 | 0.16 | 72 | 85 | 0.2 | 0 | 9.4 | 11.0 | ○ | +1.0 |

MD: machine direction
TD: transverse direction

Example 21

Pellets of polyethylene terephthalate (intrinsic viscosity 0.65, glass transition temperature 75° C., melting point 255° C., containing 0.2 wt % aggregated silica particles of average diameter 0.3 μm) were vacuum-dried at 180° C. for 3 hours, supplied to an extruder heated at 280° C., and extruded through the T-die into a sheet. The sheet was put over a cooling drum with a surface temperature of 25° C. using electrostatic force to ensure their close contact, so that the sheet would be cooled to solidify into a non-stretched cast film. This non-stretched film was held by clips at its ends, introduced to a tenter for simultaneous biaxial stretching, pre-heated at a temperature of 110° C., subjected to the first-step simultaneous biaxial stretching to a draw ratio of 2 times in the machine direction and a draw ratio of 2 times in the transverse direction for an area draw ratio of 4 times, subjected to the second-step simultaneous biaxial stretching at 80° C. to a draw ratio of 3 times in the machine direction and a draw ratio of 3 times in the transverse direction for an area draw ratio of 9 times, subjected to the third-step simultaneous biaxial stretching at 160° C. to a draw ratio of 1.3 times in the machine direction and a draw ratio of 1.2 times in the transverse direction for an area draw ratio of 1.56 times, heat-treated at a temperature of 230° C., relaxed in the 150° C. cooling zone at a relaxation rate of 2% in the machine direction and a relaxation rate of 3% in the transverse direction, cooled gradually to room temperature, and wound. The extrusion rate was controlled to adjust the film thickness to 4.5 μm. The temperature of tenter clips was 105° C. Table 21 shows the film production conditions and breakage frequency, and Table 22 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 23 shows the resultant film's Young's modulus, circumferential half-width of the diffraction line, crystal size, diagonal Young's modulus, propagating tear strength in the width direction, refractive index in the normal direction, planar orientation index, and density, while Table 24 gives its creep compliance, heat shrinkage starting temperature, heat shrinkage at 80° C., and peak intensity in laser Raman scattering (R), as well as the color printing properties of heat transfer ribbons. The film of the present invention was found to be a very suitable material for heat transfer ribbons.

TABLE 21

| | 1st simultaneous biaxial stretching | | | 2nd simultaneous biaxial stretching | | | 3rd simultaneous biaxial stretching | | | Total draw ratio (times) | Breakage frequency |
|---|---|---|---|---|---|---|---|---|---|---|---|
| | Temp. (° C.) | Draw ratio (times) MD | TD | Temp. (° C.) | Draw ratio (times) MD | TD | Temp. (° C.) | Draw ratio (times) MD | TD | | |
| Example 21 | 110 | 2.0 | 2.0 | 80 | 3.0 | 3.0 | 160 | 1.3 | 1.2 | 56 | ○ |

MD: machine direction
TD: transverse direction

TABLE 22

| | Properties of non-stretched film | | | | Properties of film after MD stretching 1 and TD stretching 1 | | | |
|---|---|---|---|---|---|---|---|---|
| | End thickness ratio (A/B) | Refractive index MD | TD | Crystallinity (%) | Refractive index MD | TD | Birefringence | Crystallinity (%) |
| Example 21 | 3.8 | 1.572 | 1.571 | 0.8 | 1.576 | 1.575 | 0.001 | 1.1 |

MD: machine direction
TD: transverse direction

TABLE 23

| | Young's modulus (GPa) MD | TD | Circumferential half-width of diffraction line (°) | Crystal size (Å) | Diagonal Young's modulus (GPa) 45° | 135° | Propagating tear strength in width direction (g/5 μm) | Refractive index in normal direction | Planar orientation index | Density (g/cm³) |
|---|---|---|---|---|---|---|---|---|---|---|
| Example 21 | 7.0 | 6.1 | 81 | 68 | 6.5 | 6.6 | 0.9 | 1.481 | 0.180 | 1.399 |

MD: machine direction
TD: transverse direction

TABLE 24

| | Creep compliance (GPa$^{-1}$) | | Heat shrinkage starting temperature (° C.) | | Heat shrinkage at 100° C. (%) | | Peak intensity in laser Raman scattering (R) | | Printing properties | |
|---|---|---|---|---|---|---|---|---|---|---|
| | MD | TD | MD | TD | MD | TD | $I_{MD}/I_{ND}$ | $I_{TD}/I_{ND}$ | gradation | wrinkle |
| Example 21 | 0.28 | 0.30 | 75 | 88 | 0.9 | 0.1 | 9.2 | 8.5 | good | none |

MD: machine direction
TD: transverse direction

Example 22

Pellets of polyethylene terephthalate (intrinsic viscosity 0.65, glass transition temperature 75° C., melting point 255° C., containing 0.1 wt % calcium phosphate particles of average diameter 0.2 μm) were vacuum-dried at 180° C. for 3 hours, supplied to an extruder heated at 280° C., and extruded through the T-die into a sheet. The sheet was put over a cooling drum with a surface temperature of 25° C. using electrostatic force to ensure their close contact, so that the sheet would be cooled to solidify into a non-stretched cast film. A film simultaneously stretched biaxially was produced by the same procedure as in Example 21 except that the stretch temperature and draw ratio were as shown in Table 25 and that the film thickness and the heat treatment temperature were 3.5 μm and 220° C., respectively. Table 25 shows the film production conditions and breakage frequency, and Table 26 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 27 shows the resultant film's Young's modulus, circumferential half-width of the diffraction line, crystal size, diagonal Young's modulus, propagating tear strength in the width direction, refractive index in the normal direction, planar orientation index, and density, while Table 28 gives its creep compliance, heat shrinkage starting temperature, heat shrinkage at 80° C., peak intensity in laser Raman scattering (R), dielectric loss tangent, and dielectric breakdown voltage. The film of the present invention was found to be a very suitable material for electrostatic capacitors.

TABLE 25

| | 1st simultaneous biaxial stretching | | | 2nd simultaneous biaxial stretching | | | 3rd simultaneous biaxial stretching | | | Total draw | |
|---|---|---|---|---|---|---|---|---|---|---|---|
| | Temp. | Draw ratio (times) | | Temp. | Draw ratio (times) | | Temp. | Draw ratio (times) | | ratio | Breakage |
| | (° C.) | MD | TD | (° C.) | MD | TD | (° C.) | MD | TD | (times) | frequency |
| Example 22 | 110 | 2.0 | 2.0 | 80 | 3.0 | 3.0 | 160 | 1.3 | 1.2 | 56 | ○ |

MD: machine direction
TD: transverse direction

TABLE 26

| | Properties of non-stretched film | | | | Properties of film after MD stretching 1 and TD stretching 1 | | | |
|---|---|---|---|---|---|---|---|---|
| | End thickness ratio (A/B) | Refractive index | | Crystallinity (%) | Refractive index | | Birefringence | Crystallinity (%) |
| | | MD | TD | | MD | TD | | |
| Example 22 | 4.0 | 1.572 | 1.571 | 0.8 | 1.576 | 1.575 | 0.001 | 1.0 |

MD: machine direction
TD: transverse direction

TABLE 27

| | Young's modulus (GPa) | | Circumferential half-width of diffraction line (°) | Crystal size (Å) | Diagonal Young's modulus (GPa) | | Propagating tear strength in width direction (g/5 μm) | Refractive index in normal direction | Planar orientation index | Density (g/cm$^3$) |
|---|---|---|---|---|---|---|---|---|---|---|
| | MD | TD | | | 45° | 135° | | | | |
| Example 22 | 7.3 | 6.2 | 70 | 65 | 6.8 | 6.9 | 0.9 | 1.480 | 0.182 | 1.397 |

MD: machine direction
TD: transverse direction

TABLE 28

| | Creep compliance (GPa$^{-1}$) | | Heat shrinkage starting temperature (° C.) | | Heat shrinkage at 100° C. (%) | | Peak intensity in laser Raman scattering (R) | | Dielectric loss | Breakdown voltage |
|---|---|---|---|---|---|---|---|---|---|---|
| | MD | TD | MD | TD | MD | TD | $I_{MD}/I_{ND}$ | $I_{TD}/I_{ND}$ | tangent | (V/μm) |
| Example 22 | 0.25 | 0.29 | 78 | 85 | 0.2 | 0 | 9.2 | 8.5 | 1.03 | 600 |

MD: machine direction
TD: transverse direction

Example 23

Pellets of a polyethylene terephthalate-polyethylene isophthalate copolymer (intrinsic viscosity 0.70, glass transition temperature 75° C., melting point 225° C., copolymerization ratio of 80/20, containing 0.2 wt % aggregated silica particles of average diameter 0.3 μm) were vacuum-dried at 120° C. for 3 hours, pre-heated, vacuum-dried at 180° C. for 3 hours, supplied to an extruder heated at 270° C., and extruded through the T-die into a sheet. The sheet was put over a cooling drum with a surface temperature of 25° C. using electrostatic force to ensure their close contact, so that the sheet would be cooled to solidify into a non-stretched cast film. This non-stretched film was held by clips at its ends, introduced to a tenter for simultaneous biaxial stretching, pre-heated at a temperature of 105° C., subjected to the first-step simultaneous biaxial stretching to a draw ratio of 2 times in the machine direction and a draw ratio of 2 times in the transverse direction for an area draw ratio of 4 times, subjected to the second-step simultaneous biaxial stretching at 75° C. to a draw ratio of 3 times in the machine direction and a draw ratio of 3 times in the transverse direction for an area draw ratio of 9 times, subjected to the third-step simultaneous biaxial stretching at 150° C. to a draw ratio of 1.3 times in the machine direction and a draw ratio of 1.3 times in the transverse direction for an area draw ratio of 1.69 times, cooled to 120° C., cooled gradually to room temperature, and wound. The resultant film had a heat of crystal melting (ΔH) of 25 J/g. This film was stuck to a sheet of Japanese paper with a weight of 12 g/m$^2$ to produce base paper for thermosensitive stencil printing, which was used to print a test pattern with Risograph (Riso Kagaku Corporation) for evaluation of the printing properties of the base paper for thermosensitive stencil printing. Table 29 shows the film production conditions and breakage frequency, and Table 30 gives the ratio (A/B) of the maximum thickness of the edge part of the non-stretched film (A) to its thickness at the center of width (B), its refractive index, and its crystallinity, as well as the refractive index, birefringence, and crystallinity during the film production process. Table 31 shows the resultant film's Young's modulus, circumferential half-width of the diffraction line, crystal size, diagonal Young's modulus, propagating tear strength in the width direction, refractive index in the normal direction, planar orientation index, and density, while Table 32 gives its creep compliance, peak intensity in laser Raman scattering (R), and printing properties of the film as base paper for thermosensitive stencil printing. The base paper for thermosensitive stencil printing produced from the film of the present invention was found to serve for clear printing.

TABLE 29

| | 1st simultaneous biaxial stretching | | | 2nd simultaneous biaxial stretching | | | 3rd simultaneous biaxial stretching | | | Total draw ratio (times) | Breakage frequency |
|---|---|---|---|---|---|---|---|---|---|---|---|
| | Temp. (° C.) | Draw ratio (times) MD | TD | Temp. (° C.) | Draw ratio (times) MD | TD | Temp. (° C.) | Draw ratio (times) MD | TD | | |
| Example 23 | 105 | 2.0 | 2.0 | 75 | 3.0 | 3.0 | 150 | 1.3 | 1.3 | 61 | ○ |

MD: machine direction
TD: transverse direction

TABLE 30

| | Properties of non-stretched film | | | | Properties of film after MD stretching 1 and TD stretching 1 | | | |
|---|---|---|---|---|---|---|---|---|
| | End thickness ratio (A/B) | Refractive index MD | TD | Crystallinity (%) | Refractive index MD | TD | Birefringence | Crystallinity (%) |
| Example 23 | 4.5 | 1.573 | 1.570 | 0.8 | 1.575 | 1.575 | 0 | 1.1 |

MD: machine direction
TD: transverse direction

TABLE 31

| | Young's modulus (GPa) | | Circumferential half-width of diffraction line (°) | Crystal size (Å) | Diagonal Young's modulus (GPa) | | Propagating tear strength in width direction (g/5 μm) | Refractive index in normal direction | Planar orientation index | Density (g/cm³) |
| --- | --- | --- | --- | --- | --- | --- | --- | --- | --- | --- |
| | MD | TD | | | 45° | 135° | | | | |
| Example 23 | 6.5 | 6.4 | 78 | 48 | 6.5 | 6.4 | 0.9 | 1.480 | 1.480 | 1.361 |

MD: machine direction
TD: transverse direction

TABLE 32

| | Creep compliance (GPa⁻¹) | | Peak intensity in laser Raman scattering (R) | | Printing properties of base paper for thermosensitive stencil printing | |
| --- | --- | --- | --- | --- | --- | --- |
| | MD | TD | $I_{MD}/I_{ND}$ | $I_{TD}/I_{MD}$ | gradation | clearness |
| Example 23 | 0.24 | 0.26 | 9.0 | 8.0 | good | good |

MD: machine direction
TD: transverse direction

Example 24

A non-stretched laminate film was produced by the same procedure as in Example 10. This non-stretched film was heated on heating rolls (surface material: silicone rubber) and stretched at a temperature of 110° C. in two steps at draw ratios of 1.5 times×1.5 times in the machine direction (MD stretching 1). The film was held by clips at its both edges and introduced into a tenter, where it was stretched in the transverse direction at a temperature of 115° C. and a draw ratio of 2 times, and then stretched in the transverse direction at a temperature of 75° C. and a draw ratio of 3.6 times (TD stretching 1 and 2). The film was heated on heating metal rolls and stretched in the machine direction at a temperature of 80° C. and a draw ratio of 3.4 times (first step of MD stretching 2). Subsequently, with its edges held by clips, the film was introduced into the tenter for simultaneous biaxial stretching, subjected to simultaneous biaxial stretching at a temperature 160° C. and at a draw ratio of 1.2 times in the machine direction and at a draw ratio of 1.3 times in the transverse direction, and subjected to simultaneous biaxial stretching at a temperature 190° C. and at a draw ratio of 1.1 times in the machine direction and at a draw ratio of 1.1 times in the transverse direction, followed by heat treatment at a temperature of 200° C., relaxation in the machine direction in the 150° C. cooling zone at a relaxation rate of 2%, relaxation in the machine direction in the 100° C. zone at a relaxation rate of 1.0%, gradual cooling to room temperature, and winding. The temperature of tenter clips of the simultaneous biaxial stretching tenter was 105° C. at the entrance of the tenter. The extrusion rate was controlled to adjust the film thickness to 6.7 μm. Table 33 shows the film production conditions, and Table 34 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 35 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 36 gives its creep compliance, heat shrinkage starting temperature, heat shrinkage at 80° C., and peak intensity in laser Raman scattering (R), as well as magnetic tape's travelling durability and preservability.

TABLE 33

| | MD stretching 1 | | TD stretching 1 | | TD stretching 2 | | MD stretching 2 | | | | TD stretching 3 | | | | Total draw ratio (times) |
| --- | --- | --- | --- | --- | --- | --- | --- | --- | --- | --- | --- | --- | --- | --- | --- |
| | | | | | | | 1st stretching | | 2nd stretching | | 1st stretching | | 2nd stretching | | |
| | Temp. (° C.) | Ratio (times) | Temp. (° C.) | Ratio (times) | Temp. (° C.) | Ratio (times) | Temp. (° C.) | Ratio (times) | Temp. (° C.) | Ratio (times) | Temp. (° C.) | Ratio (times) | Temp. (° C.) | Ratio (times) | |
| Example 24 | 110 | 1.5/1.5 | 115 | 2.0 | 75 | 3.6 | 80 | 3.4 | Simultaneous biaxial stretching (1) 160° C., 1.2*1.3, (2) 190° C., 1.1*1.1 | | | | | | 87 |
| Example 25 | Simultaneous biaxial stretching 110° C., 2.0*2.0 | | | | Simultaneous biaxial stretching 75° C., 3.3*3.3 | | 140 | 1.5 | | | 180 | 1.3 | 190 | 1.1 | 93 |

MD: machine direction
TD: transverse direction
Simultaneous biaxial stretching: stretch temp. (° C.), MD draw ratio (times), TD draw ratio (times)

TABLE 34

| | Properties of non-stretched film | | | | Properties of film after MD stretching 1 and TD stretching 1 | | | | |
|---|---|---|---|---|---|---|---|---|---|
| | End thickness ratio (A/B) | Refractive index | | Crystallinity (%) | Refractive index | | Birefringence | Crystallinity (%) | Breakage frequency |
| | | MD | TD | | MD | TD | | | |
| Example 24 | 3.8 | 1.571 | 1.570 | 0.8 | 1.576 | 1.577 | 0.001 | 0.9 | ○ |
| Example 25 | 3.0 | 1.571 | 1.570 | 0.8 | Simultaneous biaxial stretching: $n_{MD}$ = 1.576, $n_{TD}$ = 1.576, birefringence = 0, crystallinity = 0.9% | | | | ○ |

MD: machine direction
TD: transverse direction

TABLE 35

| | Young's modulus (GPa) | | Circumferential half-width of diffraction line (° C.) | Crystal size (Å) | Diagonal Young's modulus (GPa) | | Propagating tear strength in width direction (g/5 μm) | Refractive index in normal direction | Planar orienation index | Density (g/cm³) | Surface roughness (Ra) (nm) | |
|---|---|---|---|---|---|---|---|---|---|---|---|---|
| | MD | TD | | | 45° | 135° | | | | | Layer I surface | Layer II surface |
| Example 24 | 7.4 | 9.3 | 83 | 60 | 8.0 | 7.9 | 0.9 | 1.476 | 0.192 | 1.390 | 3.8 | 9.8 |
| Example 25 | 7.3 | 7.8 | 82 | 62 | 7.5 | 7.6 | 1.1 | 1.479 | 0.190 | 1.390 | 4.2 | 10.3 |

MD: machine direction
TD: transverse direction

TABLE 36

| | Creep compliance (GPa⁻¹) | | Heat shrinkage starting temperature (° C.) | | Heat shrinkage at 80° C. (%) | | Peak intensity in laser Raman scattering (R) | | Travelling durability | Recording tape peservability |
|---|---|---|---|---|---|---|---|---|---|---|
| | MD | TD | MD | TD | MD | TD | $I_{TD}/I_{ND}$ | $I_{TD}/I_{ND}$ | | |
| Example 24 | 0.20 | 0.18 | 77 | 83 | 0.1 | 0 | 8.9 | 10.5 | ○ | ○ |
| Example 25 | 0.21 | 0.19 | 73 | 85 | 0.1 | 0 | 8.7 | 9.5 | ○ | ○ |

MD: machine direction
TD: transverse direction

Example 25

The same procedure as in Example 10 was carried out to produce a non-stretched laminate film except that the space of the rip of the die was adjusted in the width direction so that the ratio (A/B) of the maximum thickness of the edge part of the non-stretched laminate film (A) to its thickness at the center of width (B) was 3.0. The film, with its ends held by clips, was introduced into the simultaneous biaxial stretching tenter, subjected to simultaneous biaxial stretching at a temperature 110° C. and a draw ratio of 2 times in both the machine direction and the transverse direction, and subjected to simultaneous biaxial stretching at a temperature 75° C. and a draw ratio of 3.3 times in both the machine direction and the transverse direction. The temperature of the clips of the simultaneous biaxial stretching tenter was 100° C. at the entrance of the tenter. The film was heated on heating metal rolls, stretched in the machine direction at a temperature of 140° C. and a draw ratio of 1.5 times, and cooled. Subsequently, with its edges held by clips, the film was introduced into the transverse stretching tenter, stretched in the transverse direction at a temperature of 180° C. and a draw ratio of 1.3 times, and stretched in the transverse direction at a temperature of 190° C. and a draw ratio of 1.1 times, followed by heat treatment at a temperature of 200° C., relaxation in the transverse direction in the 150° C. cooling zone at a relaxation rate of 3%, relaxation in the transverse direction in the 100° C. zone at a relaxation rate of 1.0%, gradual cooling to room temperature, and winding. The extrusion rate was controlled to adjust the film thickness to 6.7 μm. Table 33 shows the film production conditions, and Table 34 gives the ratio (A/B) of the maximum thickness of the edge part of the non-stretched film (A) to its thickness at the center of width (B), its refractive index, and its crystallinity, as well as the refractive index, birefringence, crystallinity, and breakage frequency during the film production process. Table 35 shows the resultant film's Young's modulus, circumferential half-width of the diffraction line, crystal size, diagonal Young's modulus, propagating tear strength in the width direction, refractive index in the normal direction, planar orientation index, density, and surface roughness, while Table 36 gives its creep compliance, heat shrinkage starting temperature, heat shrinkage at 80° C., and peak intensity in laser Raman scattering (R), as well as magnetic tape's travelling durability and preservability.

The biaxially oriented polyester films disclosed herein that are 7.0 GPa or more in at least either the Young's modulus in the machine direction (YmMD) or in the transverse direction (YmTD), and in the range of 55° or more and 85° or less in the circumferential half-width of the diffraction line from the crystal plane in the direction of the polyester's backbone chain that is determined through crystal orientation analysis by wide angle X-ray diffractometry performed while rotating the polyester film around its normal, are high in rigidity in all directions within the film plane, high in tear resistance, high in dimensional stability, and resistant to deformation under load, and have very great industrial advantages as material for high-density magnetic recording media, with wide applicability as material for electrostatic capacitor, heat transfer ribbon, and base paper for thermosensitive stencil printing.

Although preferred embodiments of the present invention have been described in detail herein, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

What is claimed is:

1. A biaxially oriented polyester film that is 7.0 GPa or more in at least either the Young's modulus in the machine direction (YmMD) or in the transverse direction (YmTD), and in the range of 55° to 85° in the circumferential half-width of the diffraction line from the crystal plane in the direction of the polyester's backbone chain that is determined through crystal orientation analysis by wide angle X-ray diffractometry performed while rotating the polyester film around its normal.

2. The biaxially oriented polyester film as specified in claim 1, wherein the crystal size in the polyester's backbone chain direction is 45 Å to 90 Å.

3. The biaxially oriented polyester film as specified in claim 1, wherein the sum of the Young's modulus in the machine direction (YmMD) and that in the transverse direction (YmTD) is 13 GPa to 25 GPa, wherein the Young's modulus, in an diagonal direction of, is 6 GPa to 10 GPa.

4. The biaxially oriented polyester film as specified in claim 1, wherein the creep compliance after being left for 30 minutes under the conditions of a temperature of 50° C. and a load of 28 MPa is 0.11 GPa$^{-1}$ to 0.35 GPa$^{-1}$.

5. The biaxially oriented polyester film as specified in claim 1, wherein the propagating tear strength of the film, converted to 5 μm thickness, in the transverse direction is 0.7 g to 1.8 g.

6. The biaxially oriented polyester film as specified in claim 1, wherein the polyester is polyethylene terephthalate.

7. The biaxially oriented polyester film as specified in claim 6, wherein at least either the ratio $R_1$ (=$I_{MD}/I_{ND}$) of the peak intensity in the machine direction ($I_{MD}$) to that in the normal direction ($I_{ND}$) at 1615 cm$^{-1}$ measured by laser Raman scattering or the ratio $R_2$ (=$I_{TD}/I_{ND}$) of the peak intensity in the transverse direction ($I_{TD}$) to that in the normal direction ($I_{ND}$) is 6 or more.

8. The biaxally oriented polyester film as specified in claim 6, wherein the refractive index in the normal direction ($n_{ZD}$) is 1.470 to 1.485, with the planar orientation index ($f_n$) being 0.175 to 0.195.

9. The biaxially oriented polyester film as specified in claim 6, wherein the density of the film is 1.385 to 1.400.

10. The biaxially oriented polyester film as specified in claim 6, wherein the heat shrinkage starting temperature of the film is 70° C. or more, with the heat shrinkage at a temperature of 80° C. being 0.5% or less.

11. A high-density magnetic recording medium comprising a biaxially oriented polyester film as specified in claim 1.

12. An electrostatic capacitor comprising a biaxially oriented polyester film as specified in claim 1.

13. A heat transfer ribbon comprising a biaxially oriented polyester film as specified in claim 1.

14. A method for producing a biaxially oriented polyester film specified in claim 1 wherein substantially amorphous polyester film is stretched biaxially in the machine and transverse directions so that the birefringence (Δn) and the crystallinity of the film become 0–0.02 and 6% or less, respectively, and the film is further stretched in the transverse direction at a temperature lower than the temperature for the preceding transverse stretching, followed by second longitudinal stretching.

15. A method for producing a biaxially oriented polyester film specified in claim 1 wherein substantially amorphous polyester film is stretched biaxially in the machine direction and the transverse direction so that the birefringence (Δn) and the crystallinity of the film become 0–0.02 and 6% or less, respectively, and the film is further stretched in the transverse direction at a temperature lower than the temperature for the preceding transverse stretching, and the film is re-stretched in the machine direction, followed by multiple-step simultaneous biaxial stretching in the machine direction and the transverse direction in the temperature range of (polyester's melting point Tm–130)° C. to (Tm–10)° C. and at an area draw ratio of 1.5 to 5 times.

* * * * *